(12) United States Patent
Craner et al.

(10) Patent No.: US 8,984,550 B2
(45) Date of Patent: Mar. 17, 2015

(54) PARENTAL MEDIA PALETTES

(75) Inventors: Michael Craner, Exton, PA (US); Tia D. Peterson, Ardmore, PA (US)

(73) Assignee: Rovi Guides, Inc., Santa Clara, CA (US)

( * ) Notice: Subject to any disclaimer, the term of this patent is extended or adjusted under 35 U.S.C. 154(b) by 205 days.

(21) Appl. No.: 12/911,114

(22) Filed: Oct. 25, 2010

(65) Prior Publication Data

US 2011/0099572 A1  Apr. 28, 2011

Related U.S. Application Data

(63) Continuation of application No. 12/608,360, filed on Oct. 29, 2009, now abandoned, which is a continuation of application No. 11/273,921, filed on Nov. 14, 2005, now abandoned.

(51) Int. Cl.
| | |
|---|---|
| H04N 7/16 | (2011.01) |
| H04N 5/445 | (2011.01) |
| H04N 21/454 | (2011.01) |
| H04N 21/475 | (2011.01) |
| H04N 21/482 | (2011.01) |

(52) U.S. Cl.
CPC ........... *H04N 7/163* (2013.01); *H04N 21/4542* (2013.01); *H04N 21/4751* (2013.01); *H04N 21/4753* (2013.01); *H04N 21/4755* (2013.01); *H04N 21/482* (2013.01)
USPC .................... 725/28; 725/29; 725/46; 725/52

(58) Field of Classification Search
CPC ...................................................... H04N 7/163
USPC ...................................................... 725/27–29
See application file for complete search history.

(56) References Cited

U.S. PATENT DOCUMENTS

| | | |
|---|---|---|
| 2,700,065 A | 1/1955 | Evans |
| 2,851,550 A | 9/1958 | Searcy |
| 2,856,474 A | 10/1958 | Norris |
| 3,879,332 A | 4/1975 | Leone |
| 4,012,583 A | 3/1977 | Kramer |
| 4,015,139 A | 3/1977 | Cleary et al. |
| 4,079,419 A | 3/1978 | Siegle et al. |
| 4,081,753 A | 3/1978 | Miller |
| 4,081,754 A | 3/1978 | Jackson |

(Continued)

FOREIGN PATENT DOCUMENTS

| | | |
|---|---|---|
| AU | 2159288 A | 3/1989 |
| FR | 2678091 | 12/1992 |

(Continued)

OTHER PUBLICATIONS

"A New Approach to Addressability," CableData product brochure, Cable Data, Sacramento, California, undated.

(Continued)

*Primary Examiner* — Nathan Flynn
*Assistant Examiner* — Sumaiya A Chowdhury
(74) *Attorney, Agent, or Firm* — Ropes & Gray LLP

(57) ABSTRACT

Systems and methods for viewing media content are provided. Sets of permitted media content and/or channels that have been screened in advance by parents are created. Content suggestions may also be made. In response to media set creation and activation, permitted programming in the media set may be tuned and presented to a viewer, while access to other media content is restricted.

25 Claims, 18 Drawing Sheets

(56) References Cited

U.S. PATENT DOCUMENTS

| | | |
|---|---|---|
| 4,156,850 A | 5/1979 | Beyers, Jr. |
| 4,162,513 A | 7/1979 | Beyers, Jr. et al. |
| 4,163,254 A | 7/1979 | Block et al. |
| 4,167,658 A | 9/1979 | Sherman |
| 4,170,782 A | 10/1979 | Miller |
| 4,225,884 A | 9/1980 | Block et al. |
| 4,228,543 A | 10/1980 | Jackson |
| 4,246,495 A | 1/1981 | Pressman |
| 4,247,743 A | 1/1981 | Hinton et al. |
| 4,288,809 A | 9/1981 | Yabe |
| 4,305,101 A | 12/1981 | Yarbrough et al. |
| 4,321,593 A | 3/1982 | Ho et al. |
| 4,348,696 A | 9/1982 | Beier |
| 4,355,415 A | 10/1982 | George et al. |
| 4,390,901 A | 6/1983 | Keiser et al. |
| 4,425,579 A | 1/1984 | Merrell |
| 4,429,385 A | 1/1984 | Cichelli et al. |
| 4,482,789 A | 11/1984 | McVey |
| 4,484,217 A | 11/1984 | Block et al. |
| 4,484,220 A | 11/1984 | Beetner |
| 4,488,179 A | 12/1984 | Kruger et al. |
| 4,488,764 A | 12/1984 | Pfenning et al. |
| 4,495,654 A | 1/1985 | Deiss |
| 4,510,623 A | 4/1985 | Bonneau et al. |
| 4,528,589 A | 7/1985 | Block et al. |
| 4,536,791 A | 8/1985 | Campbell et al. |
| 4,566,033 A | 1/1986 | Reidenouer |
| 4,573,072 A | 2/1986 | Freeman |
| 4,588,901 A | 5/1986 | Maclay et al. |
| 4,598,288 A | 7/1986 | Yarbrough et al. |
| 4,604,708 A | 8/1986 | Lewis |
| 4,605,964 A | 8/1986 | Chard |
| 4,605,973 A | 8/1986 | Von Kohorn |
| 4,620,229 A | 10/1986 | Amano et al. |
| 4,636,595 A | 1/1987 | Smock et al. |
| 4,647,735 A | 3/1987 | Sicher |
| 4,648,667 A | 3/1987 | Baumgart |
| 4,685,131 A | 8/1987 | Horne |
| 4,718,107 A | 1/1988 | Hayes |
| 4,750,213 A | 6/1988 | Novak |
| 4,768,229 A | 8/1988 | Benjamin et al. |
| 4,807,023 A | 2/1989 | Bestler et al. |
| 4,809,393 A | 3/1989 | Goodrich et al. |
| 4,823,385 A | 4/1989 | Hegendorfer |
| 4,855,611 A | 8/1989 | Isobe et al. |
| 4,862,268 A | 8/1989 | Campbell et al. |
| 4,885,775 A | 12/1989 | Lucas |
| 4,888,796 A | 12/1989 | Olivo, Jr. |
| 4,890,320 A | 12/1989 | Monslow et al. |
| 4,890,321 A | 12/1989 | Seth-Smith et al. |
| 4,903,031 A | 2/1990 | Yamada |
| 4,930,158 A | 5/1990 | Vogel |
| 4,930,160 A | 5/1990 | Vogel |
| 4,994,908 A | 2/1991 | Kuban et al. |
| 4,995,078 A | 2/1991 | Monslow et al. |
| 5,001,554 A | 3/1991 | Johnson et al. |
| 5,021,916 A | 6/1991 | Hubbard |
| 5,033,085 A | 7/1991 | Rew |
| 5,038,211 A | 8/1991 | Hallenbeck |
| 5,045,947 A | 9/1991 | Beery |
| 5,046,125 A | 9/1991 | Takizawa |
| 5,051,837 A | 9/1991 | McJunkin |
| 5,053,797 A | 10/1991 | Samuels et al. |
| 5,053,884 A | 10/1991 | Kamijyo |
| 5,056,139 A | 10/1991 | Littlefield |
| 5,068,734 A | 11/1991 | Beery |
| 5,075,771 A | 12/1991 | Hashimoto et al. |
| 5,168,353 A | 12/1992 | Walker et al. |
| 5,172,111 A | 12/1992 | Olivo, Jr. |
| 5,206,722 A | 4/1993 | Kwan |
| 5,210,611 A | 5/1993 | Yee et al. |
| 5,223,924 A | 6/1993 | Strubbe |
| 5,231,310 A | 7/1993 | Oh |
| 5,235,415 A | 8/1993 | Bonicel et al. |
| 5,247,364 A | 9/1993 | Banker et al. |
| 5,253,066 A | 10/1993 | Vogel |
| 5,253,067 A | 10/1993 | Chaney et al. |
| 5,260,778 A | 11/1993 | Kauffman et al. |
| 5,303,063 A | 4/1994 | Kim et al. |
| 5,317,391 A | 5/1994 | Banker et al. |
| 5,357,276 A | 10/1994 | Banker et al. |
| 5,371,795 A | 12/1994 | Vogel |
| 5,382,983 A | 1/1995 | Kwoh et al. |
| 5,384,910 A | 1/1995 | Torres |
| 5,396,546 A | 3/1995 | Remillard |
| 5,425,101 A | 6/1995 | Woo et al. |
| 5,446,488 A | 8/1995 | Vogel |
| 5,465,113 A | 11/1995 | Gilboy |
| 5,477,262 A | 12/1995 | Banker et al. |
| 5,485,221 A | 1/1996 | Banker et al. |
| 5,485,518 A * | 1/1996 | Hunter et al. .................. 725/28 |
| 5,548,345 A | 8/1996 | Brian et al. |
| 5,550,575 A | 8/1996 | West et al. |
| 5,557,724 A | 9/1996 | Sampat et al. |
| 5,579,055 A | 11/1996 | Hamilton et al. |
| 5,583,560 A | 12/1996 | Florin et al. |
| 5,583,576 A | 12/1996 | Perlman et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,621,456 A | 4/1997 | Florin et al. |
| 5,629,733 A | 5/1997 | Youman et al. |
| 5,664,046 A | 9/1997 | Abecassis |
| 5,699,104 A | 12/1997 | Yoshinobu |
| 5,716,273 A | 2/1998 | Yuen |
| 5,751,335 A | 5/1998 | Shintani |
| 5,781,246 A | 7/1998 | Alten et al. |
| 5,828,419 A * | 10/1998 | Bruette et al. .................. 725/28 |
| 5,949,471 A | 9/1999 | Yuen et al. |
| 5,969,748 A | 10/1999 | Casement et al. |
| 6,025,869 A * | 2/2000 | Stas et al. .................. 725/28 |
| 6,038,367 A * | 3/2000 | Abecassis .................. 386/262 |
| 6,072,520 A | 6/2000 | Yuen et al. |
| 6,115,057 A | 9/2000 | Kwoh et al. |
| 6,144,401 A | 11/2000 | Casement et al. |
| 6,321,381 B1 | 11/2001 | Yuen et al. |
| 6,463,586 B1 * | 10/2002 | Jerding .................. 725/37 |
| 6,701,523 B1 * | 3/2004 | Hancock et al. .................. 725/25 |
| 6,708,176 B2 * | 3/2004 | Strunk et al. .................. 1/1 |
| 6,732,367 B1 | 5/2004 | Ellis et al. |
| 6,922,843 B1 | 7/2005 | Herrington et al. |
| 8,046,801 B2 | 10/2011 | Ellis et al. |
| 8,051,450 B2 | 11/2011 | Robarts et al. |
| 2002/0016971 A1 | 2/2002 | Berezowski et al. |
| 2002/0095673 A1 | 7/2002 | Leung et al. |
| 2003/0028622 A1* | 2/2003 | Inoue et al. .................. 709/219 |
| 2003/0066075 A1* | 4/2003 | Bahn et al. .................. 725/25 |
| 2003/0115593 A1 | 6/2003 | Alten et al. |
| 2003/0149980 A1 | 8/2003 | Hassell et al. |
| 2003/0149988 A1 | 8/2003 | Ellis et al. |
| 2003/0237088 A1 | 12/2003 | Macrae et al. |
| 2004/0019903 A1 | 1/2004 | Knudson et al. |
| 2004/0103434 A1 | 5/2004 | Ellis |
| 2004/0128681 A1 | 7/2004 | Hancock et al. |
| 2005/0028191 A1 | 2/2005 | Sullivan et al. |
| 2005/0125822 A1 | 6/2005 | Casement et al. |
| 2005/0147247 A1 | 7/2005 | Westberg et al. |
| 2005/0204388 A1* | 9/2005 | Knudson et al. .................. 725/58 |
| 2005/0251827 A1 | 11/2005 | Ellis et al. |
| 2006/0179468 A1 | 8/2006 | Pearson |
| 2007/0016528 A1 | 1/2007 | Verhaegh et al. |
| 2009/0083782 A1 | 3/2009 | Card |
| 2011/0099572 A1 | 4/2011 | Craner et al. |

FOREIGN PATENT DOCUMENTS

| | | |
|---|---|---|
| GB | 2209417 | 5/1989 |
| GB | 2210526 | 6/1989 |
| GB | 2215928 | 9/1989 |
| WO | WO 86/01962 A1 | 3/1986 |
| WO | WO 89/12370 A1 | 12/1989 |
| WO | WO 90/15507 A1 | 12/1990 |

(56) References Cited

FOREIGN PATENT DOCUMENTS

| WO | WO 93/11638 A1 | 6/1993 |
|---|---|---|
| WO | WO 93/11639 A1 | 6/1993 |
| WO | WO 93/11640 A1 | 6/1993 |

OTHER PUBLICATIONS

"Addressable Converters: A New Development at Cable Data," Via Cable, vol. 1, No. 12, Dec. 1981, Cable Data, Sacramento, California.
"Weststar and Videotoken Network Present the CableComputer" (Plaintiff's Exhibit 334).
Brugliera, Vito, "Digital On-Screen Display—A New Technology for the Consumer Interface," Symposium Record Cable Sessions of the 18th International Television Symposium & Technical Exhibition, Jun. 1993, pp. 571-586.
CableComputer User's Guide, bearing a date of Dec. 1985 (Plaintiff's Exhibit 289).
CableData, Roseville Consumer Presentation, Mar. 1986.
Committee on Commerce, "Communications Act of 1995," XP-002100790 Jul. 1995, pp. 1-4.
Common Sense Media Inc., CSM Family Friendly Reviews (from http://www.commonsensemedia.org/index.php).
Daniel F. Walsh Jr., Timing Considerations in RF Two Way Data Collection and Polling, Jerrold-Applies Media Lab, 1989 NCTA Technical Papers, pp. 47-56, 1989.
Daniel H. Smart, Innovative Aspects of a Switched Star Cabled Television Distribution System, British Cable Services Limited, 1987 NCTA Technical Papers, pp. 26-35, 1987.
Federal Communications Commission, In the Telecommunications Act of 1996, Public Law 104-104, effective Feb. 8, 1996, in Section 551, "Parental Choice in Television Programming," XP-002100791.
Gary Libman, Times Staff Writer Chaining the Channels, A New Generation of Television Blocking Systems Allows More Options for Parent, Seeking to Control Kids' Viewing, Los Angeles Times, Aug. 9, 1993.
Gregory F. Vaeth, John Feras, Enertec, Inc., The Addressable Controller of the Future, *General Instruments/Jerrold Communication*, 1990 NCTA Technical Papers, pp. 274-279, 1990.
Jerrold Communications Publication, "Cable Television Equipment," dated 1992 and 1993, pp. 8-2.1 to 8-6 and 8-14.1 to 8-14.3.
M/A-COM, Inc., "Videocipher II Satellite Descrambler Owner's Manual," dated prior to Feb. 1986.
Michael Dufresne, "New Services: An Integrated Cable Network's Approach, Videotron Communication LTEE," Technical Papers of NCTA 31st Annual Convention & Exposition, pp. 156-160 (1982).
Richard G. Merrell, Mack S. Daily, An Auto-Dialer Approach to Pay-Per-View Purchasing, Zenith Electronics Corporation, Glenview, Illinois, 1989 NCTA Technical Papers, pp. 34-38, 1989.
Roseville City Council Presentation, bearing a date of Mar. 13, 1985 (Defendant's Exhibit 26).
StarSight Telecast Inc. User's Guide, pp. 1-20 (1994).
T. Rzeszewski et al., "A Microcomputer Controlled Frequency Synthesizer for TV." Reprinted from IEEE Trans. Consum. Electron, vol. CE-24, pp. 145-153 (1978).
Videocipher Owner's Manual, M/A-Com., Publication No. 4096-048; Model No. VC-2000E or VC-2000E/B, undated.
U.S. Appl. No. 12/177,783, filed Jul. 22, 2008, Archer et al.

* cited by examiner

PARENTAL MEDIA PALETTES

CROSS-REFERENCE TO RELATED APPLICATIONS

This application is a continuation of U.S. patent application Ser. No. 12/608,360, filed Oct. 29, 2009 (now abandoned) which is a continuation of U.S. patent application Ser. No. 11/273,921, filed on Nov. 14, 2005 (now abandoned). Both of these prior applications are hereby incorporated by reference herein in their entireties.

BACKGROUND OF THE INVENTION

This invention relates generally to television systems and, more particularly, to parental controls for television systems.

There are many devices in use in television systems today for controlling access to content (e.g., video or audio content) as a function of the nature of the content (e.g., the amount of sex or violence portrayed within the content). Within such "parental control" systems (e.g., the well-known V-Chip system), program content rating information is sent along with a television signal (e.g., in the vertical blanking interval (VBI)) or stored in a program description database, as described in U.S. Pat. No. 6,760,537, included herein by reference in its entirety.

The program content rating information can include ratings for broadcast programming (e.g., Motion Picture Association of America ratings such as G, PG, PG-13, R, and NC-17) as well as numerical ratings of individual categories of program nature, such as violence, language, nudity, and sexual content. Generally, parental control systems allow a consumer to exclude or block programs meeting or exceeding certain ratings criteria.

Parental control systems present several challenges to the television viewer. First, users (e.g., parents) who use these systems must enter a password every time they wish to block/unblock a program or invoke a related parental control command. This requires a user with the appropriate administrative password to be available and ready to configure the system if needed. In addition, users must specifically identify all the programming content they wish the parental control system to block. Given the number of channels on present-day delivery systems (e.g., cable and satellite systems), and the amount of content available from video-on-demand services, this can be an arduous task. Typically, users are required to specify which content to block by rating level or other attributes contained within the program content rating information. This process typically requires an extensive amount of setup and configuration time in order to block every category of undesirable programming content.

Yet another problem with existing parental control systems is that the user must agree with subjective ratings associated with each program. Such ratings are often assigned by third parties and are potentially not applied consistently across all content and categories. For example, a cinematic film designated as "PG" by the Motion Picture Association of America may still contain offensive or otherwise undesirable content for young children. As another example, one film rated PG by a given rating authority may be acceptable to a particular parent, while another film rated PG may not be acceptable. Parents may wish to further restrict or limit such content regardless of the supplied ratings.

In addition, existing parental control systems usually require the participation and compliance of the broadcaster or content provider. For example, program content rating information typically must be sent along with the television signal in order for existing parental control systems to function properly. This usually requires a broadcaster or multiple service operator (MSO) to augment the program signal. However, many types of media, such as Internet websites, interactive games, prerecorded movies, and/or video-on-demand (VOD) programs, may not contain program rating information. Thus, parental control systems relying exclusively on this information may not be able to effectively screen these programs.

Accordingly, it is desirable to provide a parental control system which improves the control parents have on the content that their children are watching, or, more generally, a content control system associated with a multimedia entertainment system (e.g., audio, video, or gaming system) that has increased flexibility in what content is accessible via the multimedia entertainment system.

SUMMARY OF THE INVENTION

These and other objects of the invention are accomplished in accordance with the principles of the present invention by providing an interactive content control application (ICCA) accessible from the home using standard user equipment. The interactive content control application limits viewable content at user-defined times to specific media contained in one or more sets of media content, called palettes. User channel and content selections, which may correspond to specific broadcast, recorded, VOD, Internet, and interactive programming, are received by the interactive content control application along with a set start time and stop time. During the palette's runtime, a user may select to view content contained in the palette on the user equipment, while access to content not specifically included within one or more active palettes is restricted. In some embodiments, the interactive content control application may work in conjunction with existing rating-based parental control systems.

Upon proper authentication, supervisors enter a privileged mode and customize the interactive content control application to start and stop at predetermined times. Supervisors in privileged mode also select media content and channels, which are accessible by the user equipment during the palette runtime, to include in one or more user palettes. The interactive content control application uses these palettes to limit what content is permitted to be displayed on the user equipment while the palette is running.

In at least some embodiments, the interactive content control application accesses a database of suggested media content and provides alternate content choices for inclusion into a palette of permitted media content based upon, for example, at least one entry in the palette, user preferences, or third-party data. In some embodiments, alternate content choices are also suggested to the user by the interactive content control application while a palette of permitted media content is running on the user equipment.

Once a palette of permitted media content is created, the interactive content control application executes the palette for viewing at a user-programmable date and time. While a palette is running on the user equipment, only the media content included in the palette may be selected for viewing by the user. In some embodiments, absent user selections, media content is automatically tuned or launched for viewing in the default order associated with the palette of permitted media content. In these embodiments, until a user makes a content selection from the palette of permitted content, the palette may act as a sequential playlist of media content by automatically playing a default option from each palette of programming options that are available at a given point in time. A sequential playlist of parentally approved programming is described in concurrently filed patent application Ser. No. 11/274,851, which is hereby incorporated by reference herein in its entirety. Palettes of permitted media content may also contain one or more interactive feedback applications that require some user input. Systems and methods for providing interactive feedback applications are described in concurrently filed patent application Ser. No. 11/273,954, which is hereby incorporated by reference herein it its entirety.

BRIEF DESCRIPTION OF THE DRAWINGS

The above and other features of the present invention, its nature and various advantages will be more apparent upon consideration of the following detailed description, taken in conjunction with the accompanying drawings, in which.

DETAILED DESCRIPTION

Figure 1:
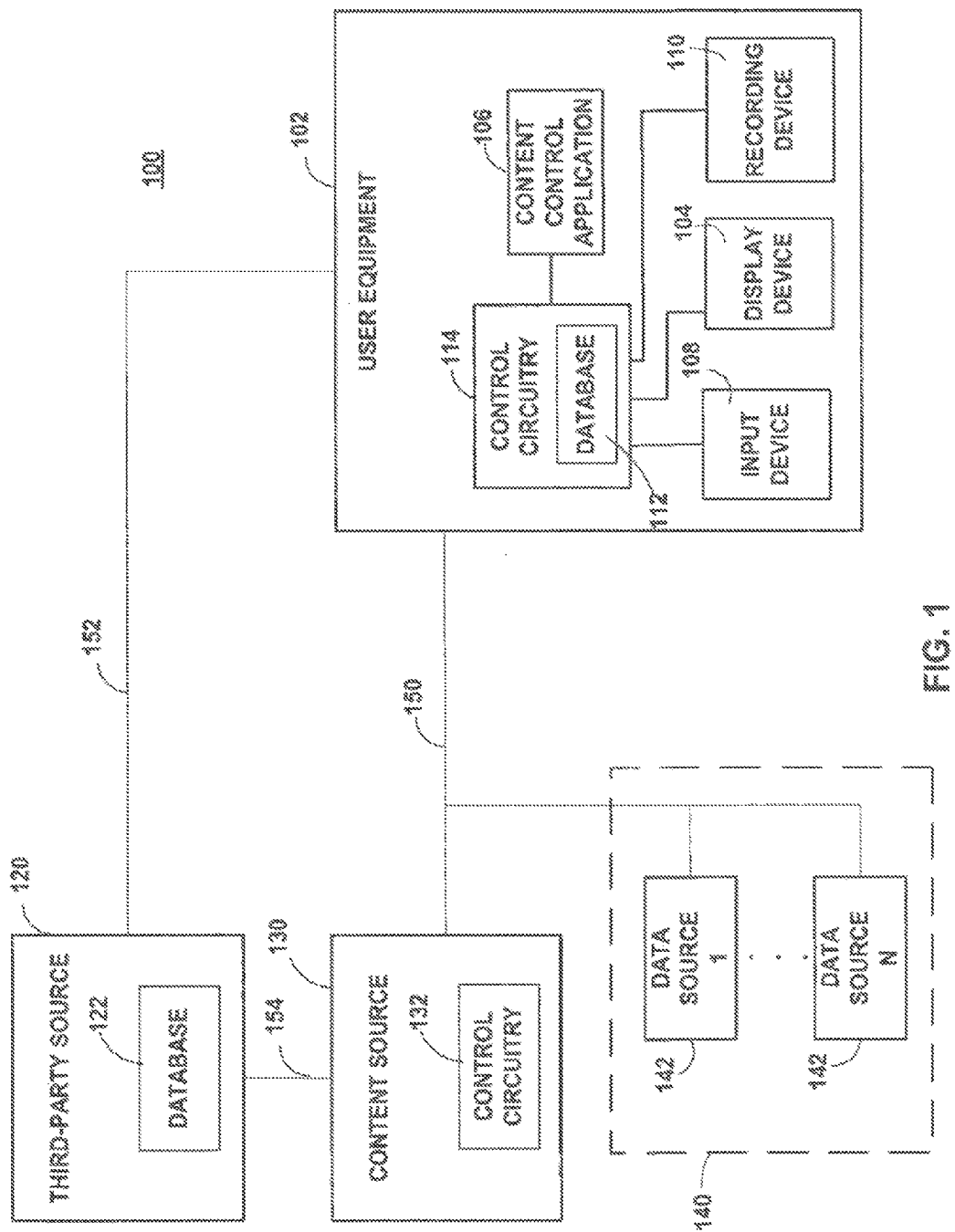
FIG. 1 is a diagram of an illustrative interactive television system in accordance with one embodiment of the present invention.

FIG. 1 shows illustrative interactive television system 100 in accordance with one embodiment of the invention. User equipment 102 receives content in the form of signals from content source 130 and/or third-party source 120 over communications paths 150 and 152. Any suitable number of users may have user equipment, such as user equipment 102, coupled to content source 130, data source 142, and third-party source 120. For the clarity of the figure, however, the user equipment of only a single user is shown. In addition, although in practice there may be numerous instances of content sources and third-party sources, for clarity only content source 130 and third-party source 120 are shown in FIG. 1.

Content source 130 may be any suitable content source such as, for example, a cable system headend, satellite television distribution facility, television broadcast facility, on-demand server (e.g., video-on-demand ("VOD") server), Internet or network media/web server, or any other suitable facility or system for originating or distributing passive or interactive media content to user equipment 102. Media content that may be provided by content source 130 to user equipment 102 includes broadcast programs, broadcast series, VOD programs, music, news, interactive applications (e.g., interactive games), Internet resources and web services (e.g., websites, newsgroups, and chat rooms), and any other media content capable of being displayed by, presented to, or interacted with, using user equipment 102.

Third-party source 120 may be any suitable data source configured to provide media content suggestions or program ratings information to content source 130 or directly to user equipment 120 via communications paths 154 and 152, respectively. Third-party source 120 may comprise any third-party application provider, data manager, content manager, content aggregator, or intermediate content provider. Third-party source 120 may also be contracted to provide enhanced parental control, services on behalf of user equipment 102. Third-party source 120 may include database 112 for access to program listings, ratings information, media content suggestion lists, media content flags, etc. For example, database 112 may hold a list of pre-approved media content for children of various age groups. Database 112 may also hold listings and pointers to this media content for access by user equipment 102 on-demand. Although database 112 is shown internal to third-party source 120, database 112 may be any storage device accessible by third-party source 120 and may be external to third-party source 120.

Database 112 may also store the interactive content control television application itself. Upon receiving a'request from user equipment 102, third-party source 120 may transmit the interactive content control application directly, to user equipment 102 via communications path 152 (or third-party source 120 may transmit the interactive content control application to content source 130 for transmission to user equipment 120, if desired). In one embodiment, the interactive content control application is an OpenCable Applications Platform ("OCAP") application downloaded by middleware to user equipment 102. User equipment 102 (or a proxy acting on behalf of the user equipment) may periodically query third-party source 120 for application updates, various third-party media content suggestion lists, media content flags, ratings information, or any other parental control or media content information.

Content source 130 and third-party source 120 may be configured to transmit signals to user equipment 102 over any suitable communications paths 150 and 152 including, for example, a satellite path, a fiber-optic path, a cable path, or any other suitable wired or wireless path. The signals may be transmitted as a broadcast, multicast, unicast, or any other suitable transmission stream. Content source 130 may also include control circuitry 132 for performing operations on the signals transmitted by the content source such as, for example, generating new signals or communicating with user equipment 102 to provide on-demand content.

User equipment 102 may receive interactive television application data from one or more instances of data sources 140, content source 130, and third-party source 120. Data sources 140 may provide data for a particular type of content or for a particular application running on user equipment 102. For example, one data source 142 may provide data for an interactive television program guide application and another data source may provide data for interactive content control application 106. In some embodiments, data sources 140 may provide data to the applications running on user equipment 102 using a client-server model. There may be one server per data source, one server for all sources, or, in some embodiments, a single server may communicate as a proxy between user equipment 102 and various data sources 140.

Content source 130, third-party source 120, and data sources 140 are shown in FIG. 1 as separate elements. In practice, their functionality may be combined into a single mechanism and provided from a single system at a single facility, or their functionality may be provided by multiple systems at multiple facilities. For example, content source 130 and data source 142 may be combined to provide broadcast television content and associated broadcast television data, including ratings information, program data, or other suitable information.

User equipment 102 may include any equipment suitable for providing an interactive media experience. For example, user equipment 102 may include computer equipment, such as a personal computer with a television card (PCTV). User equipment 102 may also include television equipment such as a television and set-top box, a recording device, a video player, a user input device (e.g., remote control, a keyboard, a mouse, a touch pad, a touch screen, and/or a voice recognition/verification module) or any other device suitable for providing a complete, interactive television experience. For example, user equipment 102 may include a DCT 2000, 2500, 5100, 6208 or 6412 set-top box provided by Motorola, Inc.

In the example of FIG. 1, user equipment 102 includes at least control circuitry 114, display device 104, interactive content control application 106, recording device 110, and user input device 108, all of which may be implemented as separate devices or as a single, integrated device. In addition to interactive content control application 106, other interactive television applications, such as an interactive television program guide, may be implemented on user equipment 102. For example, these interactive television applications may direct a tuner in control circuitry 114 to display, on display device 104, the content transmitted by content source 130 or third-party source 120 over communications paths 150 and 152 and to provide interactive television application features.

Display device 104 may be any suitable device capable of presenting human-perceivable media, such as, for example, a television monitor, computer monitor, LCD display, video projection device, holographic projector, virtual reality simulator, etc. Display device 104 may also be configured to provide audio and other sensory output.

Control circuitry 114 is adapted to receive user input from input device 108, execute the instructions of interactive content control application 106, execute any other interactive television applications, and direct display device 104 to display media content and interactive application display screens and overlays. Control circuitry 114 may include one or more tuners (e.g., analog or digital tuners), encoders and decoders (e.g., MPEG encoders and decoders), processors (e.g., Motorola 68000 family processors), memory (i.e., RAM and hard disks), communications circuitry (e.g., cable modem and ATSC 256QAM circuitry), input/output circuitry (e.g., graphics circuitry), connections to the various devices of user equipment 102 (e.g., content control application 106 and recording device 110), and any other suitable components for providing analog or digital television programming, content control, and interactive television features. In one embodiment, control circuitry 114 may be included as part of one of the devices of user equipment 102 such as, for example, part of display 104 or any other device (e.g., a set-top box, television, and/or video player).

Control circuitry 114 may include memory or storage for storing database 112 of data from data sources 140, content source 130, or third-party source 120. This data may include data for use by interactive content control application 106 (e.g., media content information, user profiles, suggested media content, user palettes, ratings information, equipment settings, or other suitable information). In some embodiments, database 112 is located in other portions of user equipment 102 or on a standalone or network device. Control circuitry 114 may also be configured to execute the instructions of interactive content control application 106 from memory, which may include any type of storage or memory mechanism (e.g., RAM, ROM, hybrid types of memory, hard disks, and/or optical drives).

Although, in the illustrated embodiment of FIG. 1, interactive content control application 106 is internal to user equipment 102, content control application 106 may be implemented externally or partially implemented externally to user equipment 102. For example, interactive content control application 106 may be implemented at third-party source 120 or content source 130 and may run using a client-server or distributed architecture where some of the application is implemented locally on user equipment 102 in the form of a client process and some of the application is implemented at a remote location in the form of a server process. Content control application 106 may also be implemented on any suitable server, computer equipment, or set-top box accessible by user equipment 102. In some embodiments, interactive content control application 106 is integrated with another interactive television application or is implemented as a standalone application, subprocess, or class (e.g., in an OCAP environment). In one embodiment, content control application 106 is completely integrated within an interactive television program guide application running on user equipment 102. In this embodiment, the management and administrative functionality of interactive content control application 106 may be invoked directly by the interactive television program guide or the underlying operating system after some user input from input device 108.

In some embodiments, interactive content control application 106 is implemented in software. However, an implementation of software and/or hardware may be used in other embodiments. These arrangements are merely illustrative.

Other suitable techniques for implementing interactive content control application 106 may be used if desired.

Interactive content control application 106 may store and manage palettes of media content created by a supervisor, palette suggestions from third-party source 120, program ratings information, and any other media content information. Interactive content control application 106 may also filter, block, augment, or otherwise modify signals from control circuitry 114 to effect various content control conditions on user equipment 102.

Palettes are sets of media descriptors that designate channels and/or media content accessible by a user at user equipment 102 during a user-specified time period. A user at user equipment 102 may choose to present any channel or content contained in an active palette during the palette runtime by selecting the appropriate media descriptor in the palette. While a palette is running, the user may not terminate the palette or be presented with channels or media content not designated by media descriptors in the palette without authorization. Although palettes are typically represented as linear sets of channels and media content, palettes may be represented by any convenient structure, including, for example, lists, arrays, tables, trees, queues, stacks, graphs, or any other linear or non-linear data structure.

For example, a palette may be simpler for a user to navigate if the palette is defined as a non-linear structure, such as a tree. A palette based on a tree structure may include several general content categories, such as sports, entertainment, and educational content. Each of these general categories may be associated with an arbitrary number of subcategories and/or specific media content selections, channels, and/or programs. A user selecting content from a palette may use the category and subcategory classifications to assist the user in finding permitted media content in the palette. Additionally, palettes may be searchable by category name, subcategory name, media content name or description, content attribute (e.g., rating, genre, and/or runtime), or any other limiting characteristic.

In some non-linear palette embodiments, the interactive content control application allows a user only to access child elements within the same category or subcategory as the content currently being displayed on the user equipment. In this way, the interactive content control application may permit access to a variable number of content elements in the palette, depending on the content currently being presented. For example, a user, who has selected to watch an educational program on U.S. geography from the palette, may only be permitted to select other content relating to U.S. geography (or other content relating to the parent category of geography or its parent category of educational content) during the remainder of the palette runtime. Authorized users of the system may elect whether to enforce category restrictions.

Palette content may include any media content capable of being displayed by, presented to, recorded, or interacted with, using user equipment 102. For example, interactive content control application 106 may launch a palette including a recorded video, a video game, an Internet website, and a VOD program during a supervisor-specified time period and under password-protected control. Media descriptors, which are selected from the palette, are objects that designate and/or identify the permitted palette content. Examples of media descriptors include media titles, website or network addresses, channel or station names or numbers, or any other object or information that identifies media content.

Interactive content control application 106 automatically launches a palette at a supervisor-specified time. Media content selections from the palette of permitted content are then received by the user equipment and presented on display device 104. In some embodiments, if a content selection is not made within some user-programmable timeout value after the launch of the palette, media content in the palette is automatically presented without user intervention on display device 104 in a default order. Additionally, all or part of the palette may be automatically recorded by interactive content control application 106 to recording device 110 if such a device is present. Recording device 110 may include any suitable storage or memory mechanism, such as a personal video recorder (PVR), digital video recorder (DVR), video cassette recorder (VCR), DVD-recorder, gaming system, or any other suitable media device.

Several palettes may be linked together to form palette chains. For example, several distinct palettes may be linked to run serially, one palette after another as if only one palette were running. These palettes may each designate a different set of permitted media content that may be presented on the user equipment. In addition, in some embodiments linked palettes may access a pool of shared permitted content. During the runtime of the palette chain, content from this shared pool or content may also be viewed on the user equipment. For example, one palette may be scheduled to run from 5:00 to 7:00 on the user equipment, while another palette is scheduled to run from 7:00 to 9:00. By linking these two palettes, a supervisor may create the effect of a single palette running on the user equipment. These two palettes may each designate different sets of permitted content for their respective runtimes and draw content from a shared set of permitted content.

Palettes may be created and maintained by supervisors at the user equipment or remote users. For example, in some embodiments a user may access a website or dial into an interactive voice response (IVR) system or application to access features of the interactive content control application. After being authenticated, a remote user accessing interactive content control features from a website or IVR system may perform all the administrative functions that a supervisor at the user equipment may perform, including, but not limited to, editing palette content and runtimes, creating, deleting, and renaming palettes, and editing user profiles. In some embodiments, remote users may access a remote server, which then transmits palette commands to the user equipment. In other embodiments, the remote user may access a web service or server running on the user equipment itself. The web service or server running on the user equipment may process all user requests and palette commands by passing the commands to the interactive content control application.

In some embodiments, the palette runtime is pre-programmed by the supervisor. In other embodiments, the start of the palette runtime may be a dynamic function based on some internal or external user equipment event. For example, a signal might be transmitted to the user equipment by content source 130 or third-party source 120 (FIG. 1). In some embodiments, this signal may immediately trigger an internal user equipment event that starts the execution of a palette of permitted content. In other embodiments this signal is used in conjunction with an internal timer in the user equipment to start the palette execution at some pre-determined amount of time after the signal is received (e.g., 30 minutes, one hour, or one day after the signal is received). In other embodiments, an external user equipment event may trigger the start of a palette. For example, a user or supervisor may power on the user equipment or attempt to use an attached input device. This external event may automatically trigger the palette to execute immediately or after some pre-determined amount of time.

In some embodiments, the content control application may lock or block access to media content on the user equipment before and/or after a palette runtime. Thus, an authorized supervisor may restrict media access for a supervisor-specified number of hours (or any other period of time) outside the palette runtime. In this way, for example, children or other users finishing a late evening palette are unable to access additional content after the palette has terminated (and after the children's bedtime). Authorized supervisors may customize the length of time the user equipment should be locked outside the palette runtime. In at least one embodiment, access to media content on the user equipment is locked at all times outside the palette runtime.

Figure 2:
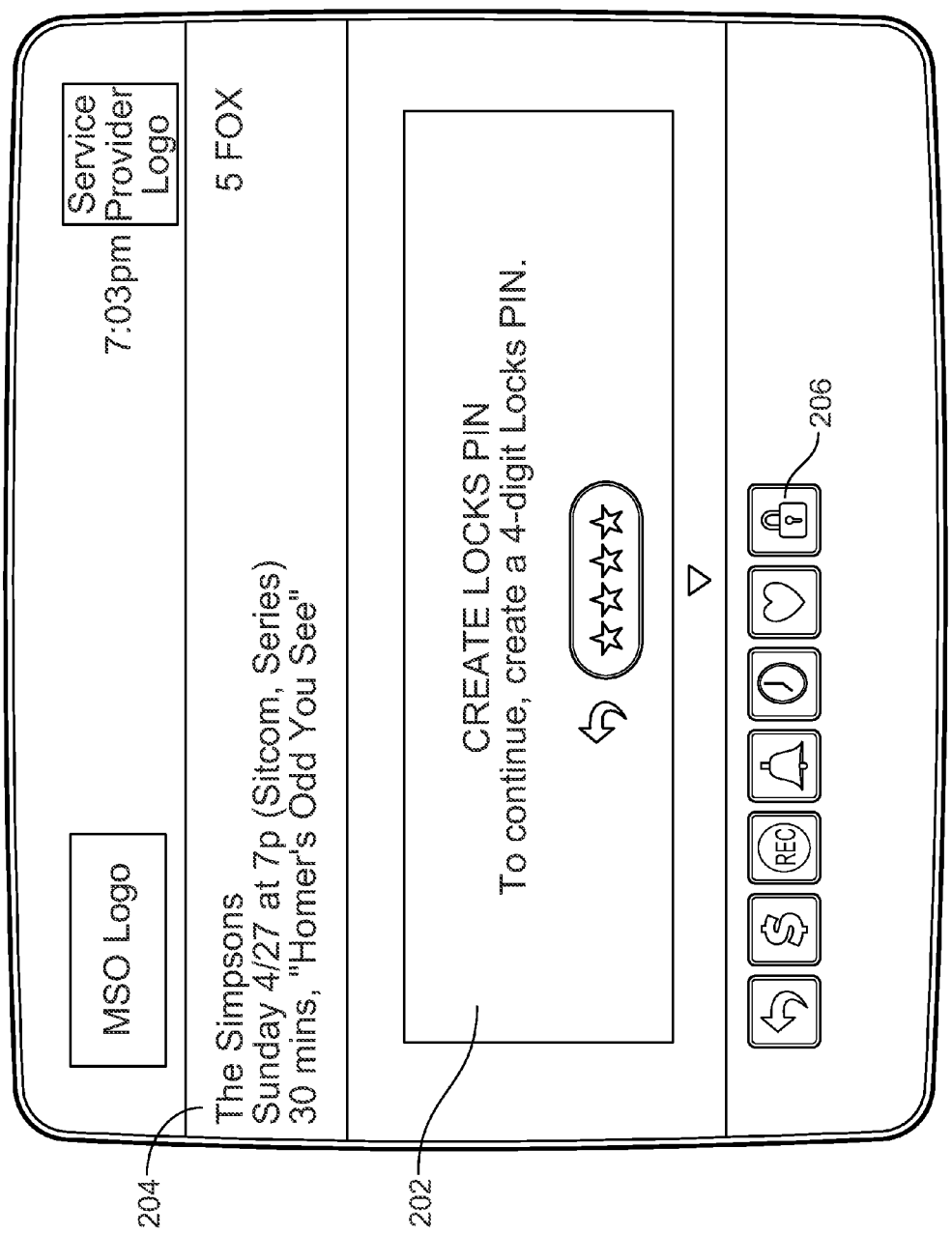
FIG. 2 shows an illustrative display screen showing an administrative parental control access code creation overlay in accordance with one embodiment of the present invention.

FIG. 2 shows illustrative display screen 200 prompting the user to create an administrative parental control access code, such as a personal identification number ("PIN"), for accessing the interactive content control application in privileged mode in accordance with one embodiment of the invention. When accessing the interactive content control application for the first time or requesting any content control functions when no parental control access code is currently set, an administrative parental control access code should be created. This parental control access code will be required for all subsequent content control access requests. In the depicted embodiment, the parental control access code is comprised of four numeric characters; however, any number of numeric or alphanumeric characters may be used as an administrative parental control access code. Users may input data into "create parental control access code overlay" 202 using any available input device (e.g., remote control, keyboard, or mouse) or via a recognition and verification module (e.g., for voice, fingerprint, or iris). For example, as is understood in the art, a voice recognition module utilizes an attached microphone to translate common phonemes into data characters and commands. The voice verification module may compare the inputted phonemes to voiceprints already stored on user equipment 102. These stored voiceprints may have been established in advance via a voice training process. If an acceptable voiceprint match is found, access to the interactive content control application's privileged menu may be granted without the use of a manual parental control access code entry. A user may also navigate through the menu overlays, input data, and control the interactive television application via voice if desired.

As depicted in FIG. 2, create parental control access code overlay 202 may be displayed on top of another interactive television application. In some embodiments, create parental control access code overlay 202 may be integrated with an interactive television program guide parental control access code overlay (e.g., the VOD ordering parental control access code overlay or another parental control access code overlay used with an interactive television program guide). In this way, all parental control access code entry and creation overlays may be identical and seamlessly integrated with an existing (e.g., "master") parental control access code overlay already resident on user equipment 102. In other embodiments, the create parental control access code overlay may be displayed directly by the interactive content control application on top of content being viewed. In the example of FIG. 2, the user has attempted to access a parental control feature from within a program information display for program 204 by selecting icon 206. Because no parental control access code is established for the user, the interactive content control application provides create parental control access code overlay 202.

Users may access the content control application and be presented with create parental control access code overlay 202 in a number of ways. For example, in some embodiments, to access the interactive content control application the user may: 1) press a special input key or command (or a series of keys or commands) on input device 108; 2) select an on-screen icon (such as icon 206); 3) be automatically linked to the interactive content control application from another interactive application; or 4) speak a pre-determined word or voice command (such as "parental palettes").

Figure 3:
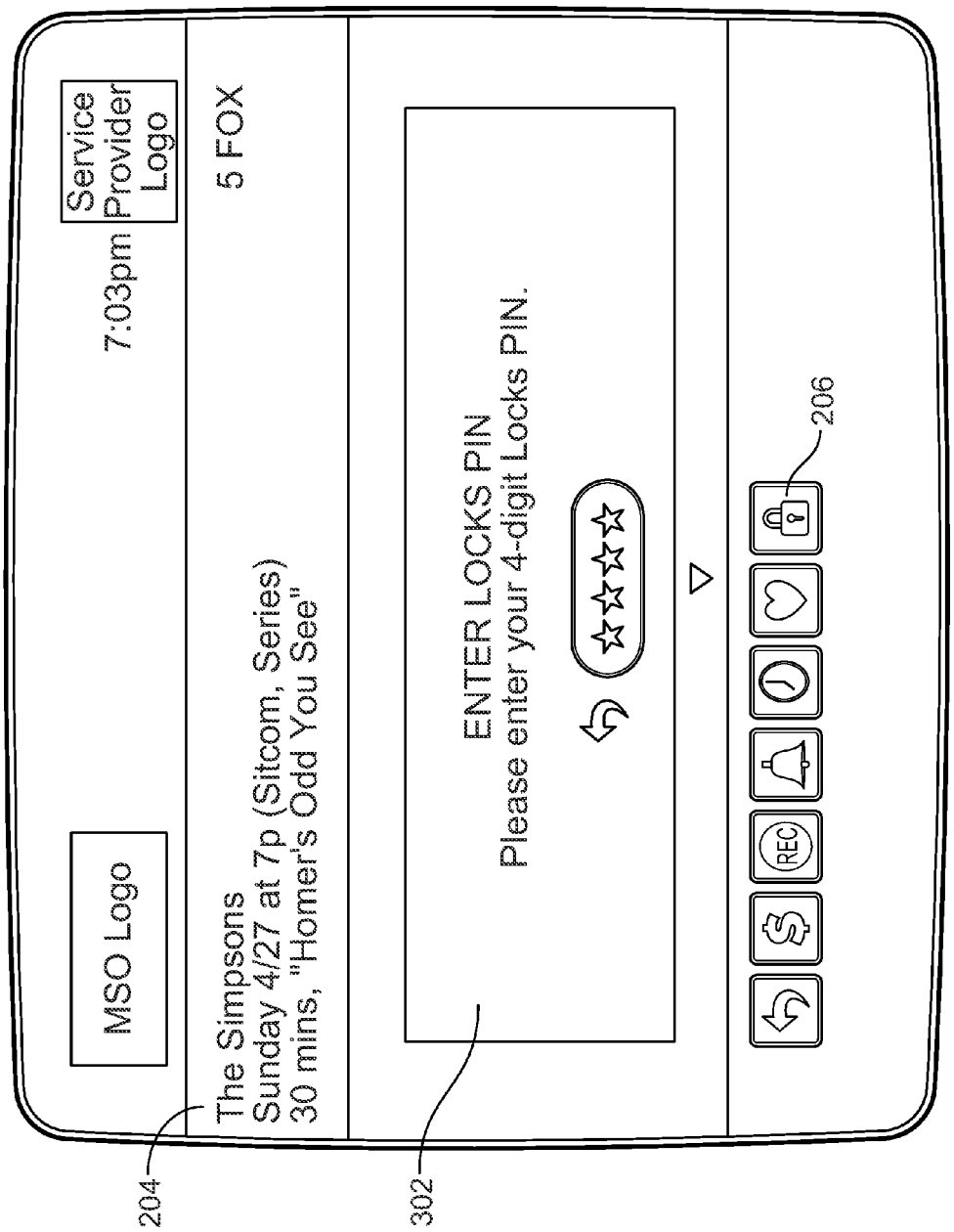
FIG. 3 shows an illustrative display screen showing an administrative parental control access code prompt overlay in accordance with one embodiment of the present invention.

FIG. 3 shows illustrative display screen 300 prompting the user to input the administrative parental control access code in accordance with one embodiment of the invention. After the initial parental control access code creation process, subsequent attempts to access the interactive content control application in privileged mode require valid input into parental control access code entry overlay 302. This prevents unauthorized users (e.g., children) from accessing the content control application and altering the palette settings. Parental control access code entry overlay 302 may be presented to the user before all content control functions, including palette creation, management, and administration. In one embodiment, a single administrative parental control access code is used to access all functions of the interactive content control application; however, users and user groups may be created with varying levels of access to interactive content control application 106. For example, some users may view and edit all palettes stored on the system, while other users may only have access to view palettes that they have created. Each user may have a personal, unique parental control access code. Content control application 106 (or control circuitry 110 or a network authentication node) may validate each parental control access code entry and grant the appropriate permissions level to each user.

Parental control access code entry overlay 302 may be presented at other times as well. Once a palette of media content is launched, a user at user equipment 102 enters restricted mode. In restricted mode, a user may only select to view media content contained within the palette of permitted content. In some embodiments, if a viewer attempts to quit or terminate a running palette before the palette stop time or attempts to access content not included in a running palette, parental control access code entry overlay 302 is displayed to the viewer for authorization. Active, running palettes may be terminated only if a valid administrative parental control access code is accepted by the interactive content control application. This prevents children and other unauthorized viewers from quitting a running palette and accessing unapproved content before the palette completion time. In some embodiments, interactive television program guide data and listing displays are restricted to include only channels and/or content contained in active palettes while a palette is running. In other embodiments, interactive television program guide data and listing displays contain all media content accessible by the user equipment, but a viewer is presented with parental control access code entry overlay 302 (or similar prompt) upon selecting media content not contained within a running palette. In addition, certain functions of input device 108 may be restricted or redefined while palettes are running, as appropriate. For example, a viewer may not be allowed to input numeric channel entries not included in an active palette until the palette restrictions terminate. As another example, the channel up and channel down keys may be redefined to allow palette content tuning rather than traditional channel tuning. Attempting to tune to an unauthorized channel or unauthorized content using input device 108 may also cause parental control access code entry overlay 302 to be displayed. In this case, a timeout on the parental control access code overlay may be implemented such that the viewer can continue watching media content in the active palette unobstructed by the parental control access code overlay.

Figure 4:
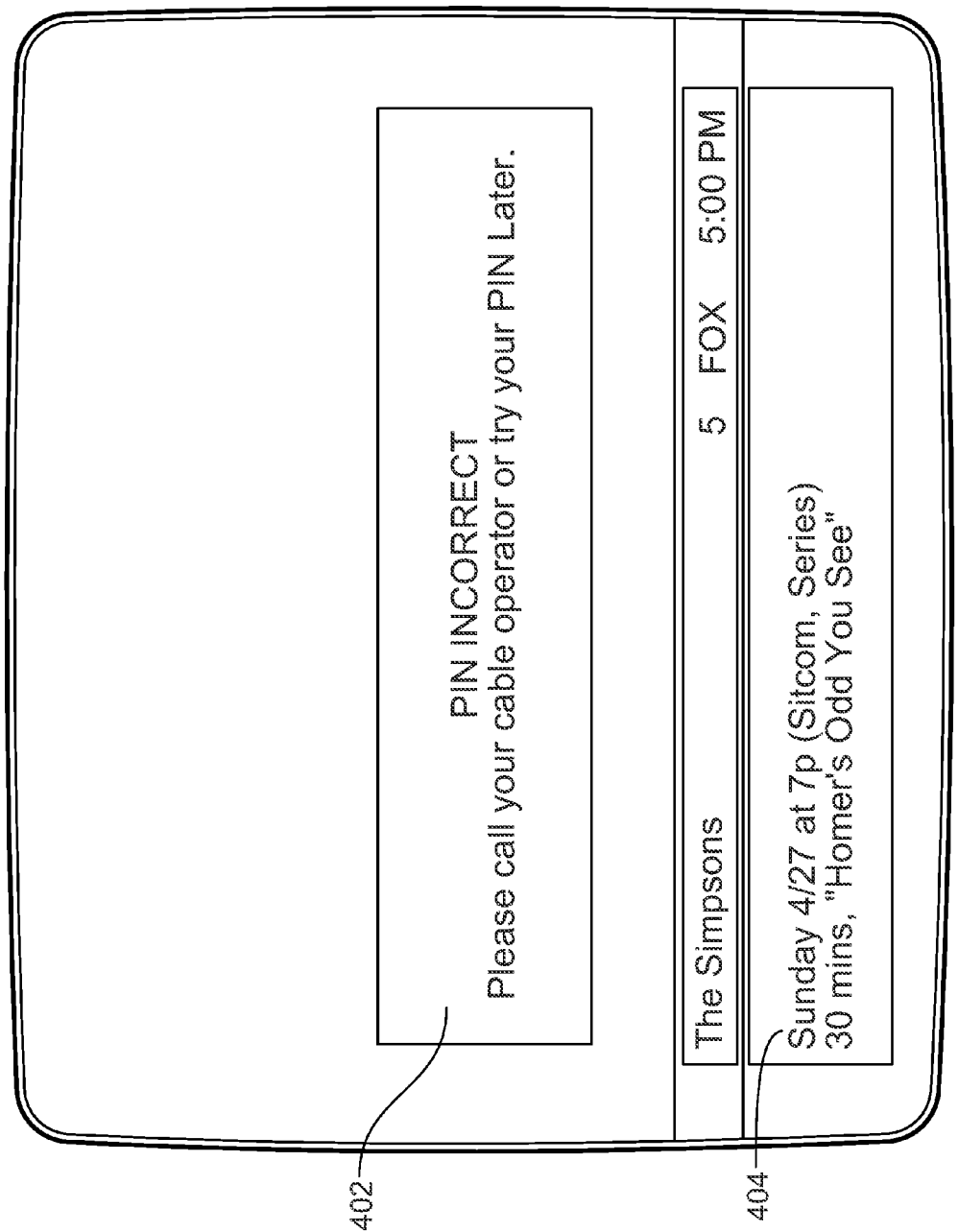
FIG. 4 shows an illustrative display screen showing an incorrect parental control access code entry overlay in accordance with one embodiment of the present invention.

FIG. 4 shows illustrative display screen 400 with incorrect parental control access code overlay 402 showing that the parental control access code entry was incorrect, invalid, or temporarily locked in accordance with one embodiment of the invention. Incorrect parental control access code overlay 402 may be presented after an unsuccessful attempt to access interactive content control application 106 in privileged mode or an unsuccessful attempt to terminate a running palette. The interactive content control application may also lock a parental control access code after a certain number of unsuccessful entry attempts. For example, in one embodiment the user is given 5 chances to input a valid parental control access code within a 30-minute time window before the parental control access code will be locked. Until the 30-minute time window has passed, access to the interactive content control system may be blocked for all users. Display screen 400 may optionally include listing 404. This listing could correspond to the unauthorized program that the viewer is attempting to access. In one or more embodiments, the interactive content control application includes a timeout for the incorrect parental control access code overlay, thus allowing the viewer to continue viewing the content in the active palette unobstructed. For example, it is anticipated that children may attempt to defeat the restrictions of the system at least once. The timeout feature would allow these children to continue to watch the palette content after such attempts.

Figure 5:
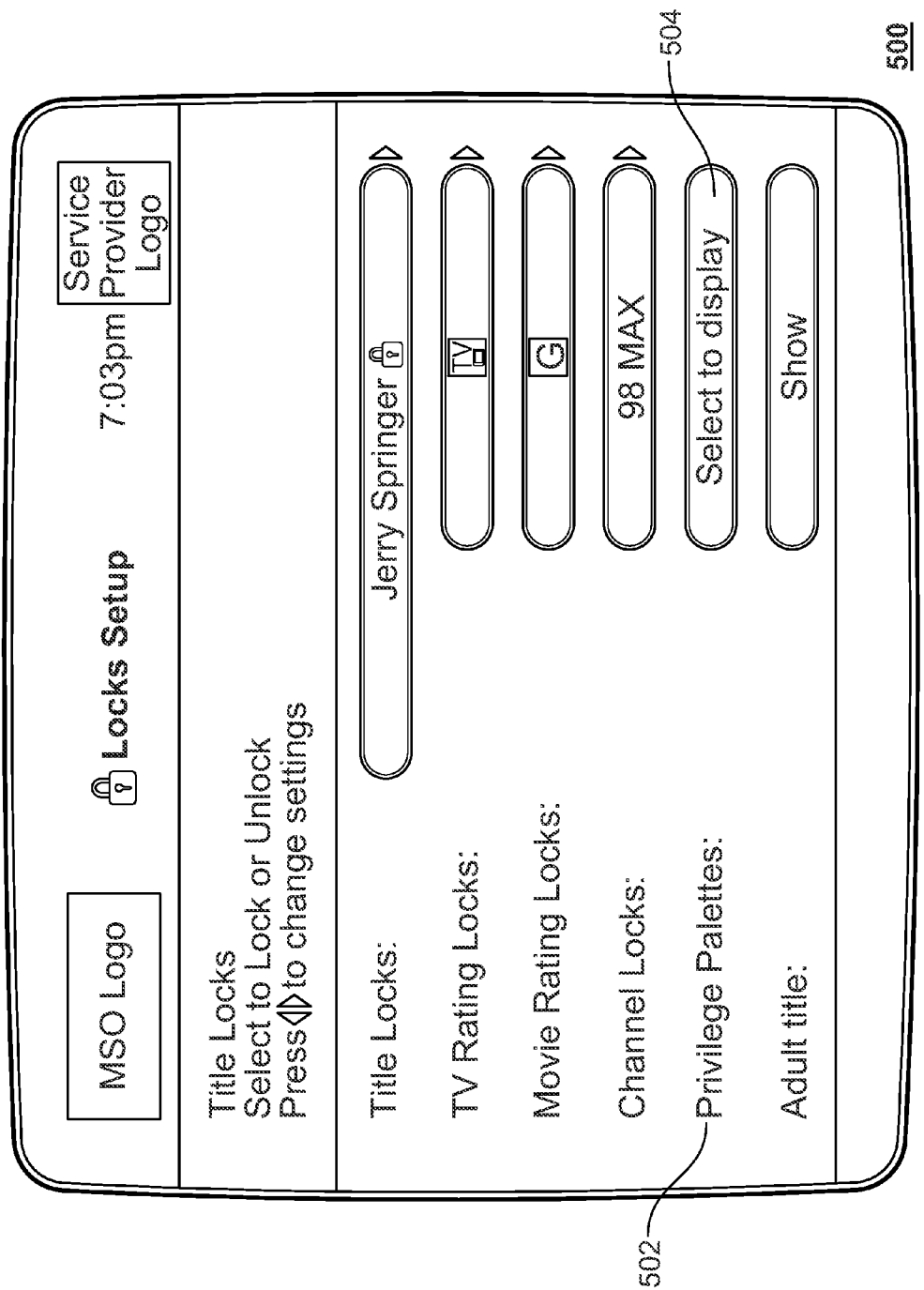
FIG. 5 shows an illustrative display screen showing a locks setup menu in accordance with one embodiment of the present invention.

FIG. 5 shows illustrative locks setup display screen 500 showing an alternative method of accessing the interactive content control application from within an interactive television program guide in accordance with one embodiment of the invention. The interactive television program guide application may already support various types of locking and parental control features. These locks may include program title locks, television and movie ratings locks, channel locks, etc. "Privilege Palettes" listing 502 may be incorporated into locks setup display 500 for easy and seamless access to the interactive content control application. Upon selecting link 504 using input device 108, the user may automatically access the interactive content control application in privileged mode. A parental control access code entry may have already validated the user prior to accessing locks setup display 500 or a supplemental parental control access code entry overlay (e.g., parental control access code entry overlay 302 or create parental control access code overlay 202) may be displayed to the user after selecting link 504.

Figure 6:
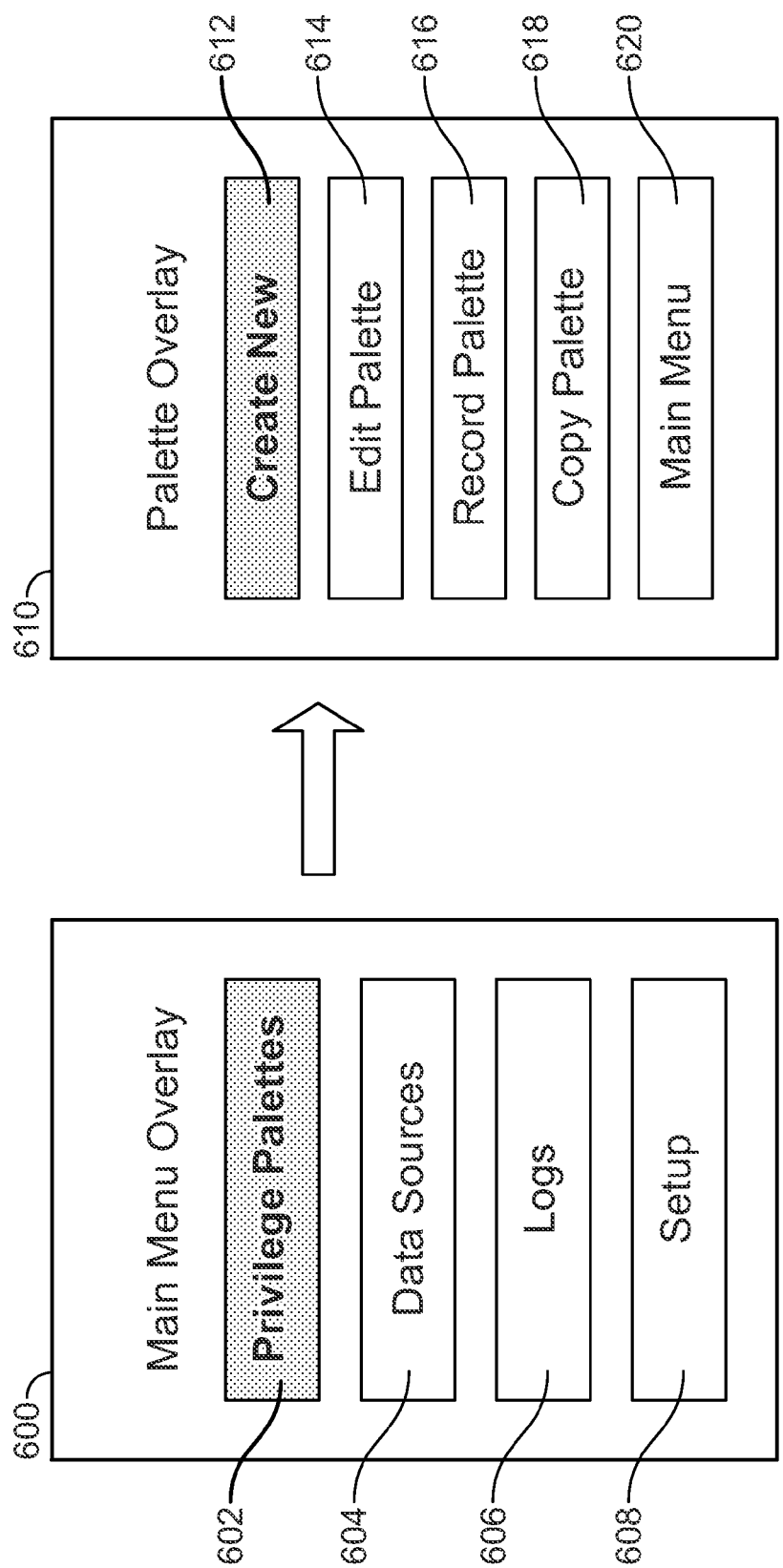
FIG. 6 shows an illustrative display screen showing main menu and palette overlays in accordance with one embodiment of the present invention.

FIG. 6 shows illustrative administrative main menu overlay 600 and palette overlay 610 in accordance with one embodiment of the invention. Upon successfully inputting a valid administrative parental control access code via parental control access code entry overlay 302 or creating a new administrative parental control access code using create parental control access code overlay 202, the user may enter privileged mode and be presented with main menu overlay 600. Main menu overlay 600 may include several selection options, including palettes selection 602, data sources selection 604, logs selection 606, and setup selection 608. Via setup selection 608, a supervisor may delete or rename user palettes, mark palettes and as active (i.e., scheduled) or inactive (i.e., unscheduled), add or remove supervisors and access permissions, configure user profiles, and set default timeout and display options.

The interactive content control application may also support advanced security, logging, and history features. For example, upon selecting logs selection 606 from main menu overlay 600 the supervisor may access security and history information, which may be logged to a log file, database 112, or recording device 110. In addition, palette modifications, palette additions, successful palette runtime completions, unsuccessful and successful palette terminations, and viewing statistics may be logged for review by a supervisor. Supervisors may also scroll through histories of palette schedules and track what media content was actually presented on user equipment 102.

To configure the various data sources accessible by user equipment 102, a supervisor may select data sources selection 604 from main menu overlay 600. This selection may present a display for adding, removing, and configuring various data sources for use with the interactive content control application. These data sources may include, for example, attached media players, gaming systems, recording devices, and/or network or content access nodes. Once a data source is configured, content from the data source may be included in a palette of media content. In some embodiments, attached data sources are automatically detected and configured by the interactive content control application.

By selecting palettes selection 602 from main menu overlay 600 the supervisor is presented with several palette management selections in palette overlay 610. The interactive content control application primarily operates on palette structures. These structures may be stored in memory (e.g., RAM, ROM, and hybrid types of memory) or storage (e.g., hard disks, tape drives, optical drives, database 112, and storage device 110) in any convenient manner. For example, in one embodiment, tables in a relational database are used to store user palettes of media content.

Palettes specify sets of specific media programs which can be presented on user equipment 102 during a specific time window, such as from 5:00 PM to 7:00 PM. The inclusion of media content into a palette means that the supervisor has deemed this material to be appropriate for viewing at the scheduled time the palette is to execute. A viewer at user equipment 102 may select to present any content contained in the palette during the palette runtime. If a viewer does not select any media content to view, the interactive content control application may present the content in the palette in a default, user-defined sequence. Alternatively or additionally, if a user fails to select content from the palette within some supervisor-defined timeout interval, advertising, music, or other media may be presented to the viewer until a content selection is made.

Upon being presented with palette overlay 610, the supervisor may choose to create a new palette, edit an existing palette, record a palette, copy a palette, or return to main menu overlay 600. By selecting edit palette selection 614, the interactive content control application provides a supervisor with the opportunity to view, edit, delete, and schedule an already existing palette. Palette overlay 610 also includes copy palette selection 618 to copy an existing palette for use as a new palette. A supervisor may also establish a palette's default presentation sequence via edit palette selection 614. In some embodiments, links to existing palettes may be listed directly on palette overlay 610 for quick, one-step access to a specific palette's management functions.

Palette overlay 610 also allows a supervisor to record the media content of one or more palettes via record palette selection 616. After selecting record palette selection 616, the supervisor may choose which palette, palettes, or parts of a palette to record. The interactive content control application then automatically records all or a defined or automatically determined portion of the media content in the palette to the user equipment or a network location. The supervisor may also specify if the recording will be a one-time recording or a periodic recording (e.g., record the palette each day or each week).

In addition to recording complete palettes, individual elements of a palette may also be automatically prerecorded for later playback or inclusion in a palette. This feature may be useful if some or all of the content a supervisor wishes to include in a palette is broadcast (or is otherwise made available) prior to the scheduled palette runtime. For example, at least one Saturday morning broadcast cartoon included in a palette to be presented on Sunday morning may be automatically recorded on Saturday morning and presented as part of the Sunday morning palette. In some embodiments, Internet resources and interactive applications are exempt from the recording option. However, in at least one embodiment, Internet websites, newsgroups, and other network content are cached (e.g., via capture of HTML code, linked content, and/or RSS feeds) to the user equipment (or a network location) for later presentation in a user palette. In accordance with the invention, prerecorded or partially prerecorded palettes are created in the same manner as traditional palettes (e.g., via edit palette selection 614 or create palette selection 612). From the viewer's perspective, prerecorded or partially prerecorded palettes may be indistinguishable from "live" palettes.

Figure 7:
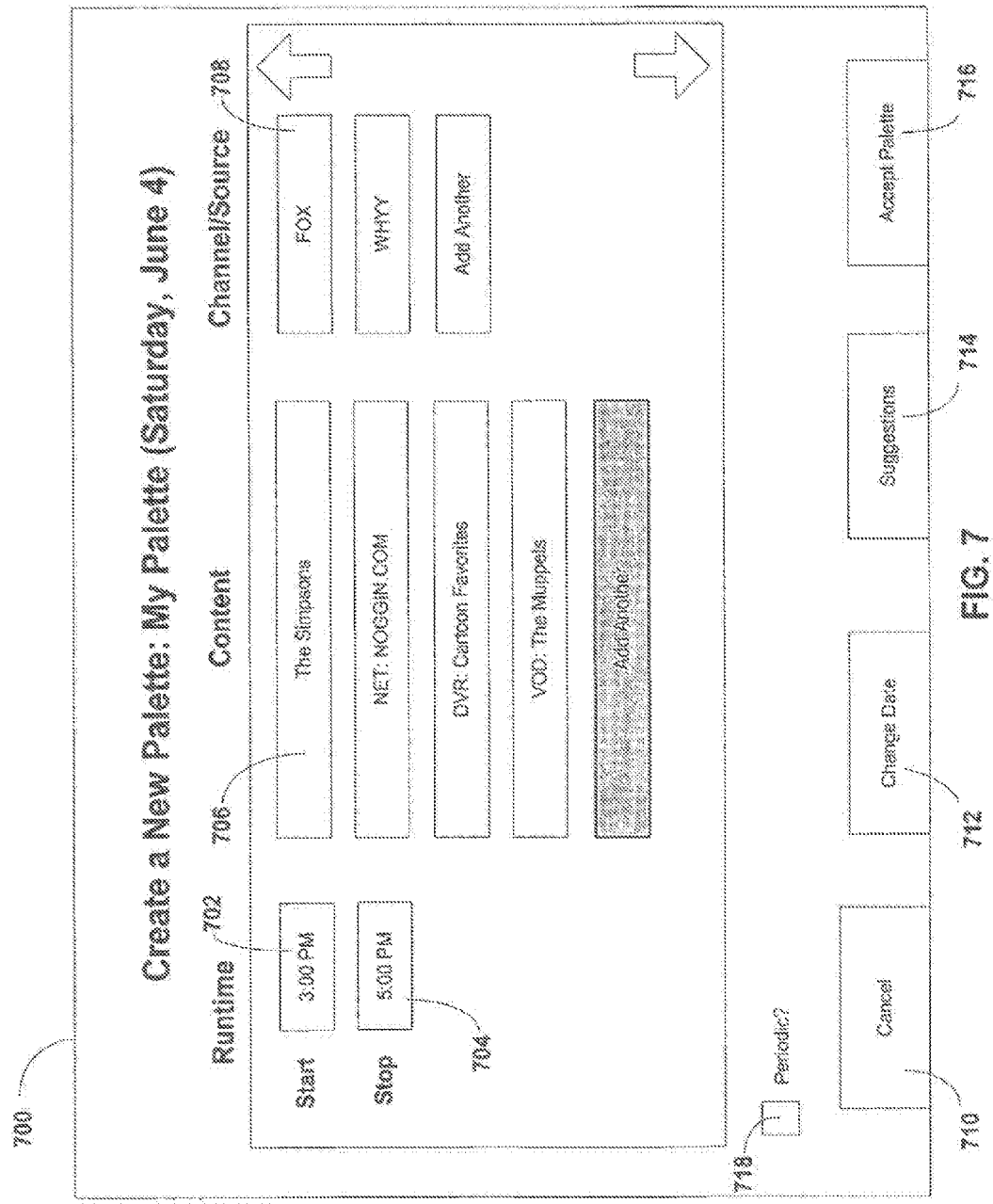
FIG. 7 shows an illustrative manual palette content input screen in accordance with one embodiment of the present invention.

Upon selecting create palette selection 612, the interactive content control application may present the supervisor with a manual palette creation screen similar to display 700 of FIG. 7 in accordance with one embodiment of the present invention. The supervisor may configure the palette start time by selecting start time selection 702. To configure the palette stop time, the supervisor may select stop time selection 704. Upon selecting a content slot in content column 706 or a channel slot in channel column 708, program and/or channel data may be presented to the supervisor in grid or table form. This data may be at least partially derived from interactive television program guide data. The supervisor may scroll or page up and down through the grid or table to view all the available content and/or channels accessible by user equipment 102 (FIG. 1) between the selected start time and stop time of the palette. Station names, channel numbers, times, and program or movie ratings may also be displayed to the supervisor, if applicable. The supervisor is then given the opportunity to select and add individual media content and channels to a palette. Series may be added by program name (e.g., "The Simpsons") or by date/time and channel combination.

The supervisor may select and add media content and channels to palette content column 706 and channel column 708 one element at a time or select multiple elements from a grid display of listings displayed by an interactive television program application. Media content may include any content capable of being displayed by, presented to, recorded, or interacted with, using user equipment 102. In the example of FIG. 7, VOD programs, recorded content, Internet resources, broadcast programs, and broadcast channels are included in the palette of permitted content. Because elements in content column 706 may be accessed from various data sources, in some embodiments, a source prefix is appended to the content title. For example, for Internet resources, the "NET" prefix may be displayed before the content name, indicating that the Internet may be accessed for the presentation of this element. For recorded programs, the "DVR" prefix may be displayed before the content name, indicating a user recording device (e.g., recording device 110 of FIG. 1) may be accessed for the presentation of this segment. For VOD programs, the "VOD" prefix may be displayed before the content name indicating a video-on-demand or pay-per-view ("PPV") channel may be accessed for the presentation of this segment. For games or removable storage (e.g., DVD) based content or applications, the "DVD" or "GAME" prefix may be displayed before the content name indicating a gaming system or removable storage may be accessed for presentation of this segment. Display screen 700 is merely illustrative and other screen layout configurations may be used without departing from the spirit of the invention.

In some embodiments, there is no limit to the number of elements which can be included in a palette. As previously described, palettes with many elements may advantageously be represented as non-linear structures for ease of navigation. In addition, scroll bars may be positioned along the top, bottom, or sides of the content input screen to allow the supervisor to view all the elements in the palette. In other embodiments, the maximum number of elements in a palette is a function of the palette's runtime. For example, a short 30-minute palette may have a maximum of six content selections, while a 2-hour palette may have a limit of 24 content selections. In some embodiments, content with a runtime longer than the palette runtime are ineligible for inclusion in the palette.

If the supervisor wishes to set up a periodic palette, periodic checkbox 718 may be selected. Upon submitting the palette to the content control application via accept palette selection 716, the supervisor will be queried for the periodic scheduling attributes via a periodic setup screen (not shown). Periodic scheduling attributes may include, for example, the frequency of the recurrence (e.g., daily, weekly, monthly, or annually) and the day of week and range of recurrence. For example, a supervisor may setup a periodic palette to be presented on user equipment 102 (FIG. 1) weekly each Saturday morning from 7:00 AM to 10:00 AM for 10 Saturday mornings, starting June 4. In this way, a palette may run without the need for specifying specific Saturday dates (although specific dates may be configurable as well, if desired). To alter the palette start date, the supervisor may select change date selection 712. The supervisor is then allowed to select a new start day of week or date for the current palette. To receive media content suggestions for all or part of the palette, the supervisor may select suggestions selection 714. To cancel the palette creation process and return to main menu overlay 600, the supervisor may select cancel selection 710.

In some instances, a supervisor, who creates a periodic palette, may be unaware of the specific content included in the palette. For example, if a supervisor creates a periodic palette with a channel element, the channel or station operator may broadcast a children's educational program on one morning during the palette runtime and a news segment on another morning during the palette runtime. This may allow a supervisor to setup a periodic palette to present unknown media content.

To prevent potentially inappropriate content (e.g., content exceeding a certain rating) from being included in a periodic palette, interactive content control application 106 may look ahead to analyze content attributes of future programming included in the periodic palette. For example, if a weekly periodic palette is created to include the FOX channel, and the palette is scheduled to launch every Monday afternoon from 4:00 to 6:00 PM, the interactive content control application may access program content attributes, including rating information, associated with content to be broadcast on the FOX channel on several future Mondays from 4:00 to 6:00 PM. Typically, several weeks of program content information is available locally on user equipment 102; however, the content control application may access more distant content information by contacting a content or data source. The supervisor of the interactive content control application may specify the look-ahead range.

In some embodiments, if the interactive content control application determines that inappropriate media content is scheduled to be broadcast during the periodic palette runtime, a warning dialog (not shown) may be presented to the supervisor. This dialog may display the potentially inappropriate content and prompt the user to confirm the selection(s). In some embodiments, the supervisor is permitted to select alternate content to replace the inappropriate content. Alternatively or additionally, the interactive content control application may suggest alternate content to replace the inappropriate content. Alternate content suggestions may be derived from supervisor, system, or third-party data. For example, content with the same rating or attribute information as another element in the palette may be selected to replace the inappropriate content. In other embodiments, a periodic palette is automatically marked inactive when the content control application determines that inappropriate content is about to be presented on the user equipment. In still other embodiments, the palette's periodicity may be limited to the range of look-ahead program data available on user equipment 102.

In other embodiments, a supervisor may associate program content criteria, such as acceptable rating information, with a periodic palette. In this way, existing rating-based parental control systems may be used in conjunction with periodic palettes. If the interactive content control application determines that palette content will exceed the user-defined program content criteria, the offending content may be automatically removed from the periodic palette. Alternatively or additionally, alternate content may be substituted for the removed content. This substituted content may be accessed from any content source accessible by the user equipment, including VOD and recorded content. The substituted content may meet the user-defined program content criteria associated with the periodic palette.

Figure 8:
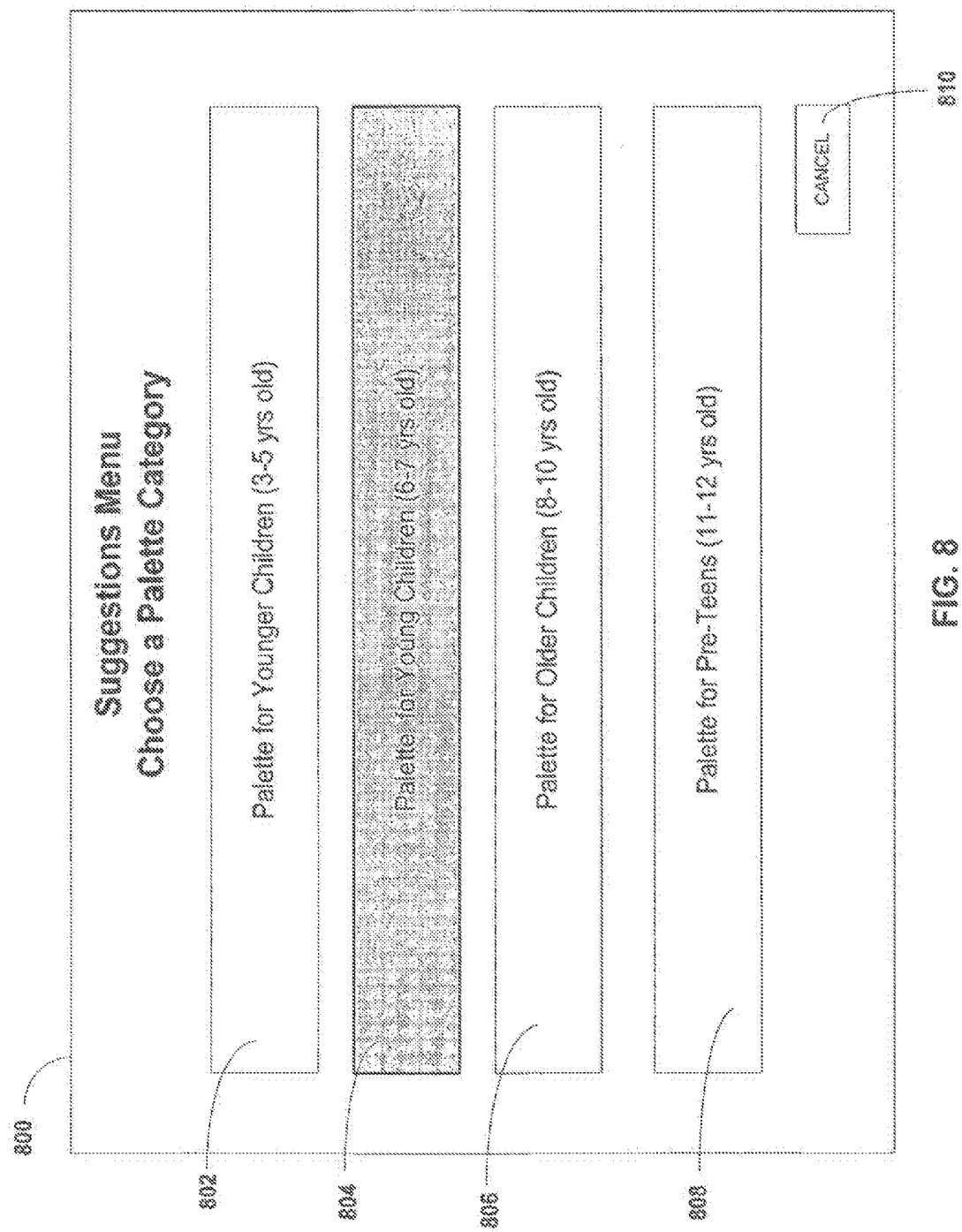
FIG. 8 shows an illustrative display screen showing palette categories for using a suggested palette of content in accordance with one embodiment of the present invention.

Upon selecting suggestions selection 714, the supervisor may be presented with category suggestions menu display 800 of FIG. 8. In some embodiments, to assist the supervisor in creating new palettes of media content or editing existing palettes of media content, the interactive content control application supports palette suggestions. For example, palette suggestions may comprise a complete palette of media content suggestions that are appropriate for children of a certain age group. As shown in illustrative display 800, these suggestions may be grouped by category for ease of navigation. The categories may be created by the supervisor, the interactive content control application, or a third party. In the example of FIG. 8, suggestions menu display 800 includes suggestion categories for younger children 802, young children 804, older children 806, and pre-teens 808. A supervisor selects the desired category from display 800 to receive a suggested palette (or one or more suggested media content selections for a palette). To discard category suggestions menu display 800 and return to manual palette creation screen 700, the supervisor may select cancel button 810.

Figure 9:
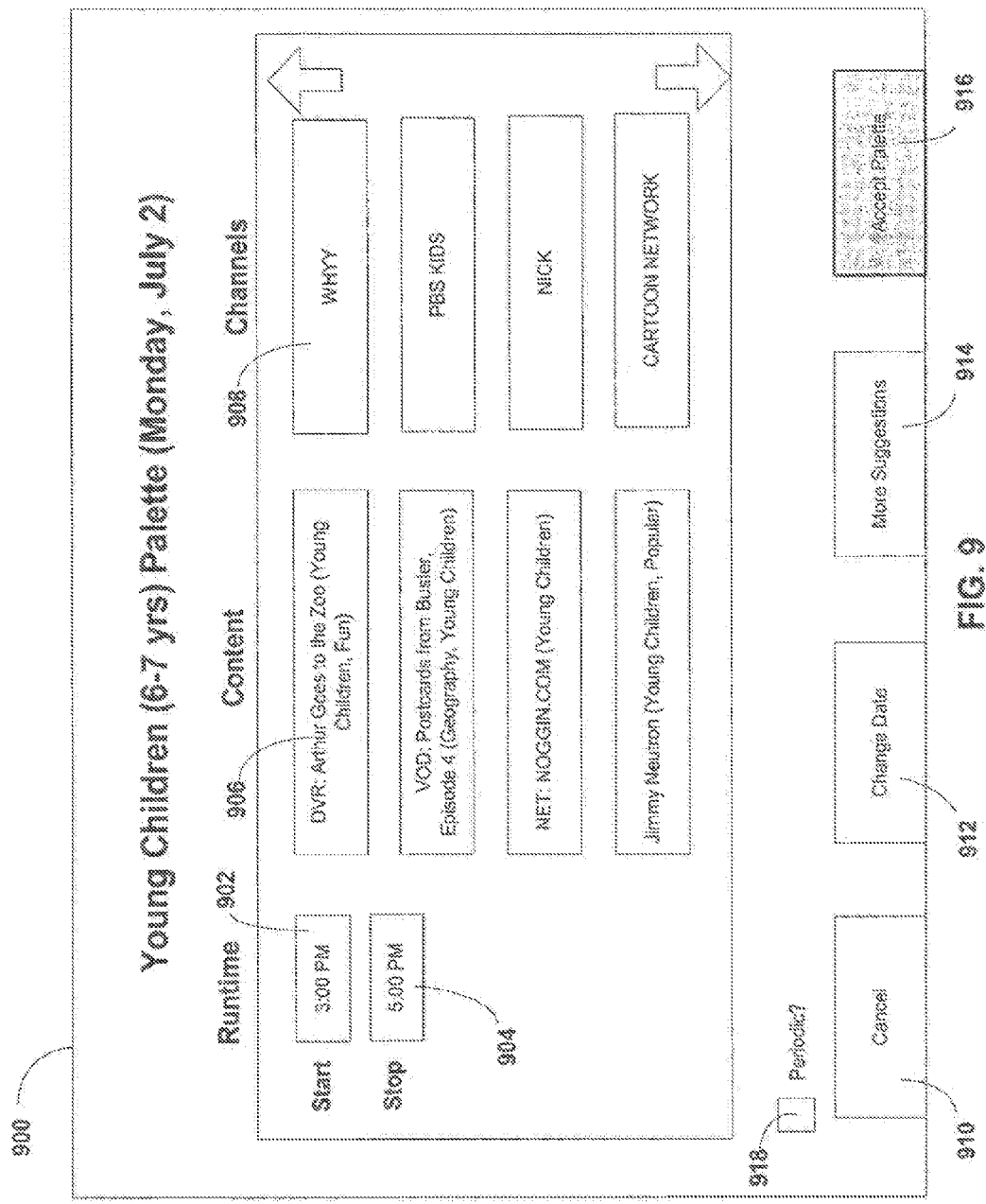
FIG. 9 shows an illustrative display screen showing a suggested young children's palette of permitted content in accordance with one embodiment of the present invention.

FIG. 9 shows an illustrative suggested palette in accordance with one embodiment of the invention. After selecting young children category 804, display screen 900 may present suggested media content for the palette to the supervisor. Suggested palettes may include channel suggestions, media content suggestions, or a combination of both channel and media suggestions. In the illustrated example, the requested palette runtime is from 3:00 PM to 5:00 PM, as configured by start time selection 902 and stop time selection 904. The palette is automatically populated with a variety of suggested content and channels. In the example of FIG. 9, these content suggestions include a recorded program, a VOD program, an Internet resource, and a broadcast program. In some embodiments, media content elements are displayed separately from channel elements. For example, content names may be displayed in content column 906, while channel names are displayed in channel column 908. In other embodiments, channel elements and media content elements are displayed in a single list.

Still referring to FIG. 9, the supervisor may modify or remove suggested content and/or suggested channels from suggested palette display 900 by selecting the element to be removed using input device 108. The supervisor may also change the presentation date or day of week of the palette via change date selection 912. If the supervisor is unhappy with the suggested palette or wishes to view more suggestions, more suggestions selection 914 may retrieve alternate media content and/or channel suggestions for one or more of the elements in the palette. Similar to periodic checkbox 718 of manual palette creation screen 700, the supervisor may also designate a suggested palette as "periodic" by selecting periodic checkbox 918. This selection sets up the palette to run on a recurring schedule. As previously discussed, if the periodic attribute is selected the supervisor may be presented with a periodic setup screen (not shown) to establish the frequency and recurrence attributes of the palette. To confirm acceptance of the palette as presented in display screen 900, the supervisor selects accept suggestions selection 916. To abandon the palette suggestion process, the supervisor may select cancel selection 910 to return to the manual palette creation screen.

Content and channel suggestions may be derived from many sources. These sources may include data from the programming provider, educational institutions, feedback from the supervisor (e.g., parents) in the form of surveys and polls, and any other data pertaining to program ratings and content. The interactive content control application or a third-party may analyze all the available data and make appropriate content suggestions. In addition, content suggestions may be based on attributes of other content in one or more active palettes (including any content which may already be in the current palette). Content attributes may include, for example, rating levels, content categories, and/or broadcast channels or service providers. For example, a Nickelodeon children's program already included in one or more active palettes may cause another Nickelodeon children's program to be suggested. As another example, an educational program emphasizing world geography skills in one palette may cause another program emphasizing U.S. geography skills to be suggested by the content control application.

To better suggest content for inclusion in a palette of media content, media content may be flagged with keyword content attributes. As shown in FIG. 9, these keyword content attributes may include, for example, such keywords as "young children" and "geography" for programs suited for young children and programs that sharpen geography skills, respectively. Media content may be associated with multiple keyword attributes. These attributes may be chained or linked to create complex category sets that are analyzed by the interactive content control application. The keyword attributes and attribute sets may be stored locally on the user equipment or accessed from a network content or data source. By comparing all known attributes to an acceptable attribute range, the interactive content control application can suggest media content for inclusion in a user palette. In some embodiments, suggestion attribute ranges are user-defined. For example, the us supervisor may specify that all media content suggestions for inclusion in the young children's palette must have both a MPAA rating of G (or TV Parental Guidelines TV-Y rating) and the lowest program nature rating available for violence. Only programs meeting these criteria may be suggested for inclusion into a palette suited for young children. In other embodiments, suggestion attribute ranges are third-party defined. For example, an educational institution may make acceptable attribute ranges available for access by user equipment 102, content source 130, or third-party source 120 (FIG. 1).

Figure 10:
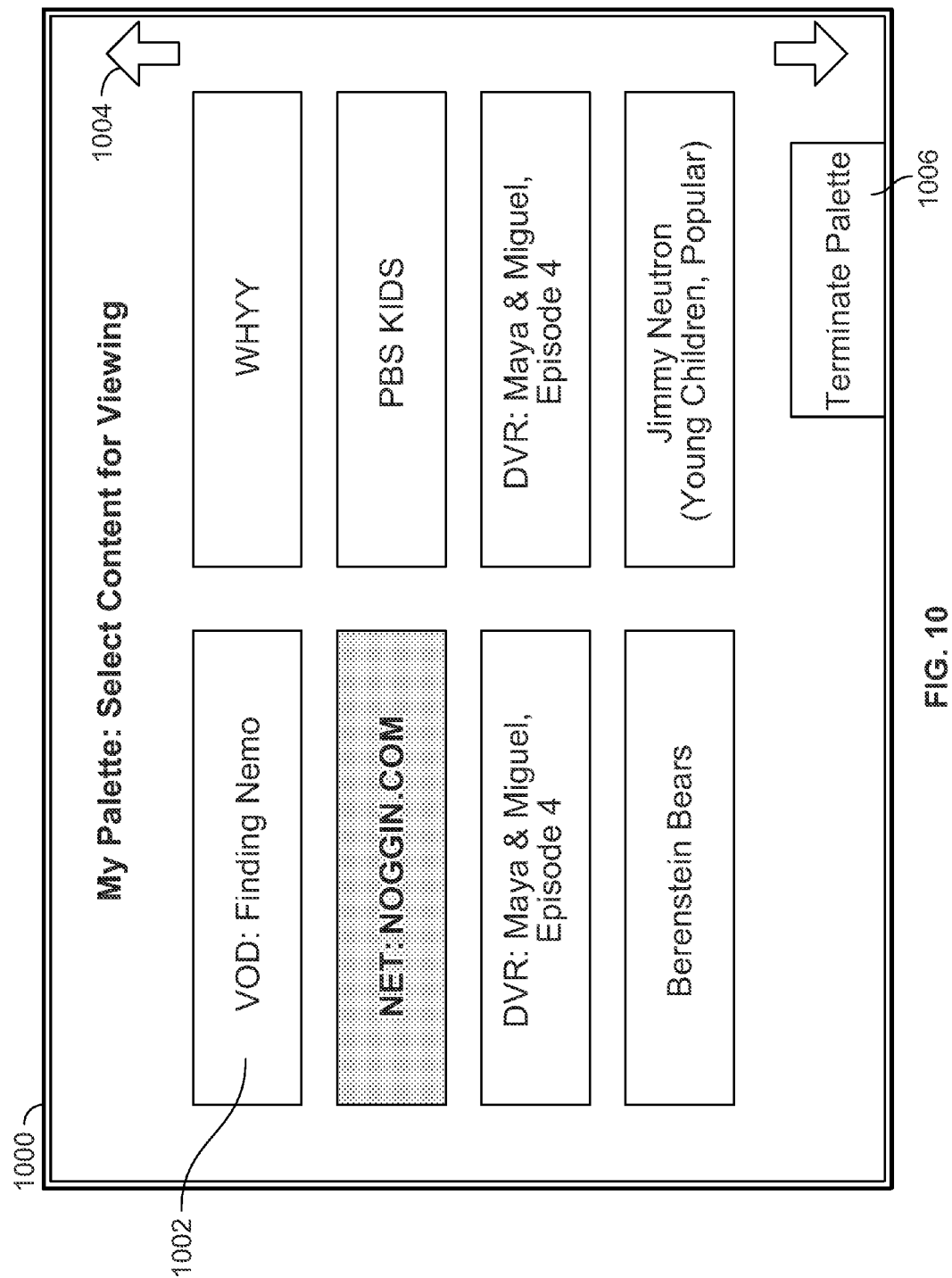
FIG. 10 shows an illustrative viewer display screen for selecting palette media content to present on the user equipment in accordance with one embodiment of the present invention.

FIG. 10 shows illustrative palette content display screen 1000 for selecting palette content to be presented on the user equipment. During a palette's runtime, interactive television program guide channel and program listing display screens may be replaced by palette content screen 1000. During this time, a user at the user equipment may browse program and channel listings 1002 of palette content screen 1000. If the palette contains more elements than can be displayed in display screen 1000, scroll bars or arrows 1004 may be selected to scroll or page up and down through the palette contents. A user may select any element from program and channel listings 1002 using input device 108 and be presented with the selected content. Although in the example of FIG. 10 station names are listed in palette content screen 1000, channel numbers may be included as well. Additionally or alternatively, the actual programming being broadcast on the channel or station may be displayed to the user in program and channel listings 1002. In particular, channel numbers or station names can be replaced by the content that is actually being broadcast on those channels at the time of presentation.

To terminate a running palette, the user may select terminate palette selection 1006. At this time, a parental control access code display may be presented to the user for authorization. If the parental control access code is not validated, the palette will continue to run. If the parental control access code is validated, the palette may terminate immediately or terminate after some user-defined period of time.

Figure 11:
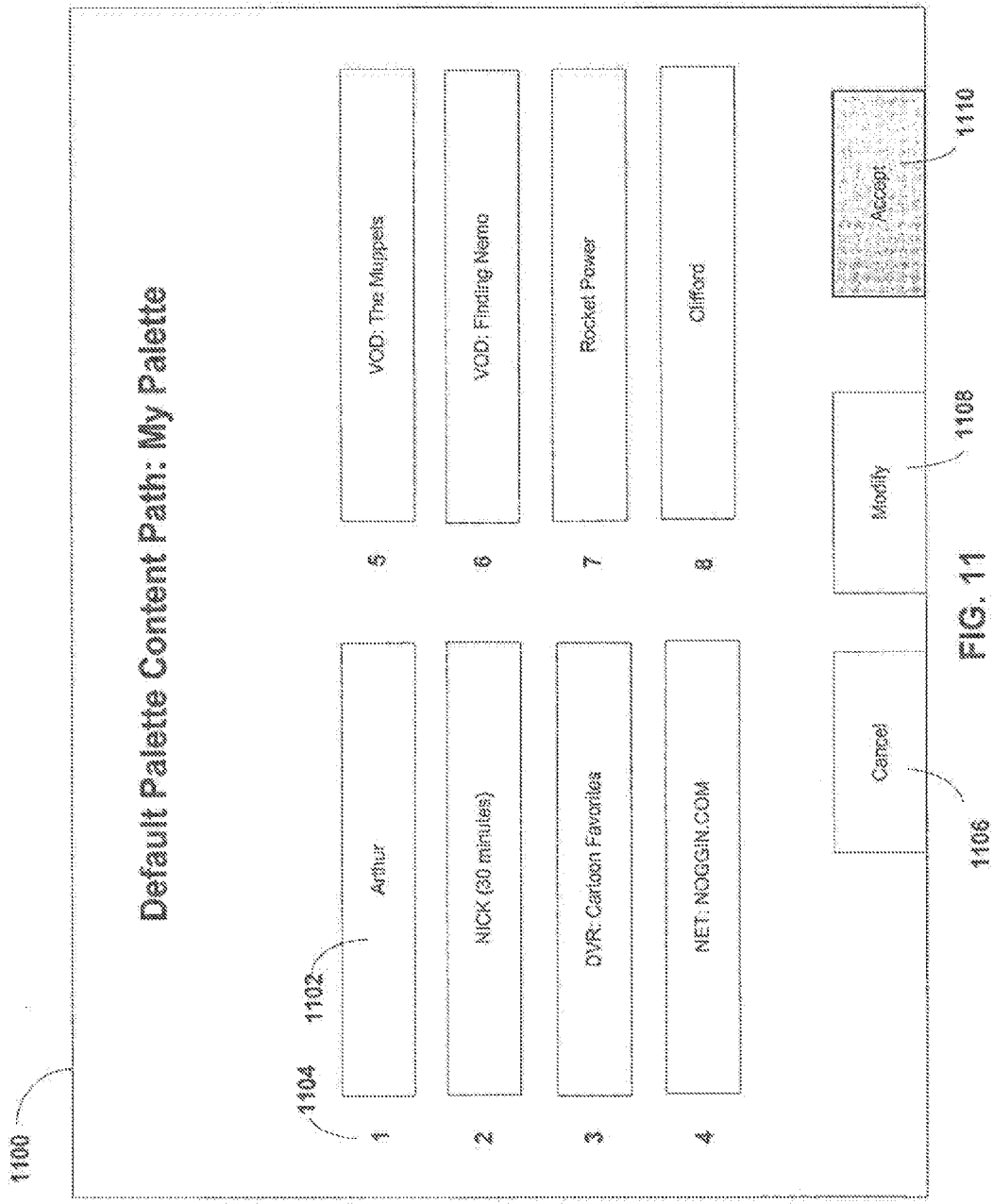
FIG. 11 shows an illustrative display screen for establishing a default palette content sequence in accordance with one embodiment of the present invention.

FIG. 11 shows default content sequence display 1000 in accordance with one embodiment of the invention. In some embodiments, in the absence of some user input requesting specific palette content at the palette start time (or after some user-selected timeout value), media content in the palette may be presented on the user equipment in the order defined by the palette's default sequence. This default sequence may be configured via default content path display 1100 after selecting edit palette selection 614 of palette overlay 610 (FIG. 6). In other embodiments, a default content sequence is not used. Rather, no content is displayed until a viewer selects content from the palette. Alternatively or additionally, advertising or music may be presented on the user equipment until some palette content is selected.

Still referring to FIG. 11, media content and channels 1102 are listed in default sequence 1104. To change the order, the user may select modify selection 1108. Upon selecting modify selection 1108, properties of the default palette presentation may also be configured. For example, the user may configure the default presentation time of channels and other media content that do not have associated runtimes. In the example of FIG. 11, channels are presented for 30 minutes before presenting the next element in the default sequence. To accept the default sequence as presented in default content path display 1100, the user may select accept selection 1112. To return to palette overlay 610 of FIG. 6, the user may select cancel selection 610.

Figure 12:
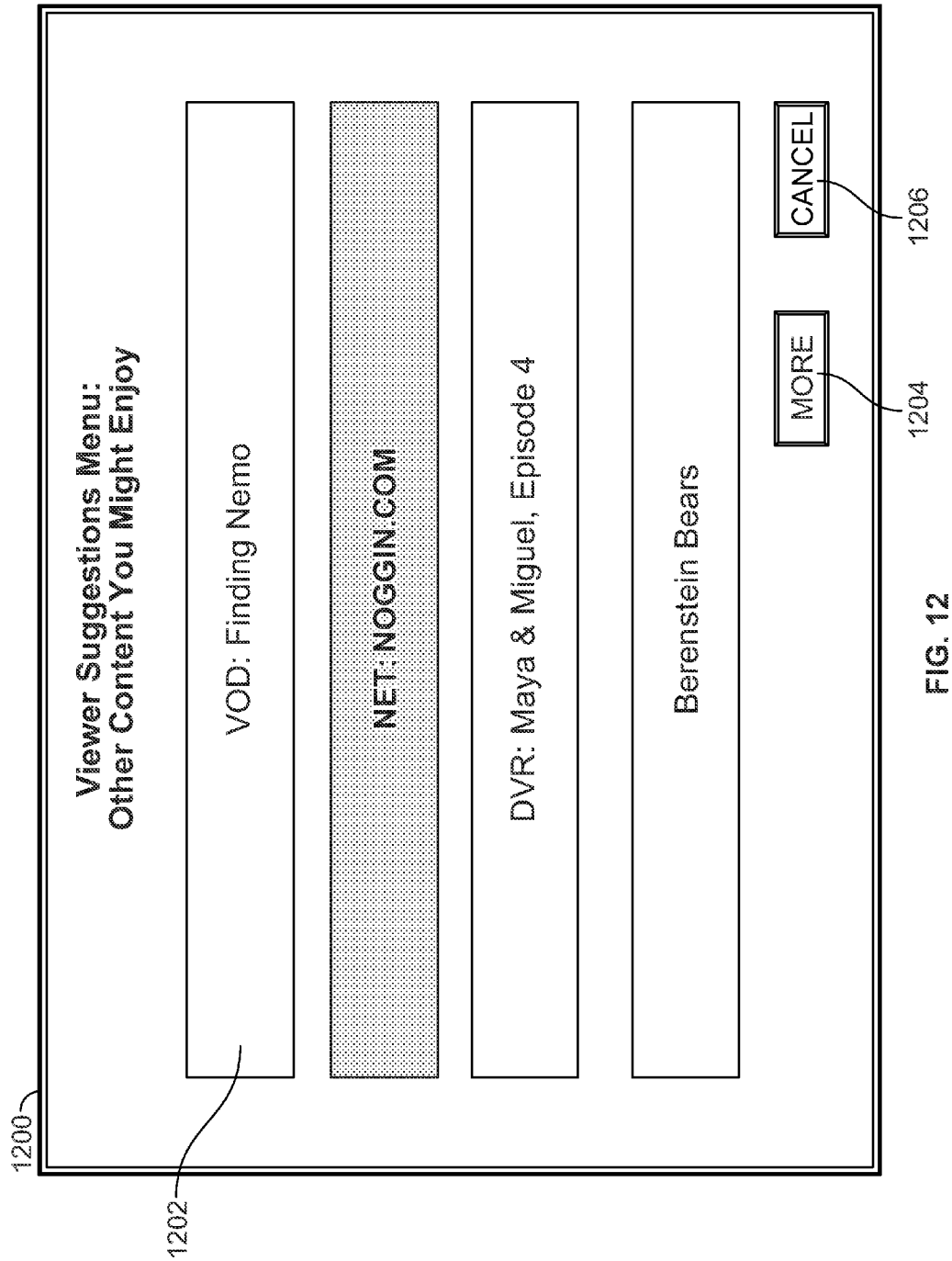
FIG. 12 shows an illustrative display screen showing a viewer's suggestion menu of suggested media content in accordance with one embodiment of the present invention.

FIG. 12 shows illustrative viewer suggestions display 1200 in accordance with one embodiment of the present invention. Viewer suggestions display 1200 may be accessed while a palette is running by using input device 108. Typically, a user, who is unsatisfied with the current programming being presented on the user equipment, requests viewer suggestions display 1200 to receive alternative content choices permitted by the current palette. Viewer suggestions 1202 in viewer suggestions display 1200 may include other content or channels in the palette or content with similar content attributes or program rating information. Viewer suggestions, like palette creation suggestions, may be derived from user, system, or third-party data. In addition, attributes of one or more elements in the palette may be used to suggest viewer content and/or channels.

The user may select any content or channel listing in viewer suggestions display 1200 to automatically tune to that content or channel. If the user wishes to continue watching the current programming being presented on display device 104, the user may select cancel selection 1206. To view more suggested content or channels, the viewer may select more selection 1204. New pages of suggested media content and channels will be presented to the user in viewer suggestions display 1100 until all the viewer suggestions have been displayed.

Figure 13:
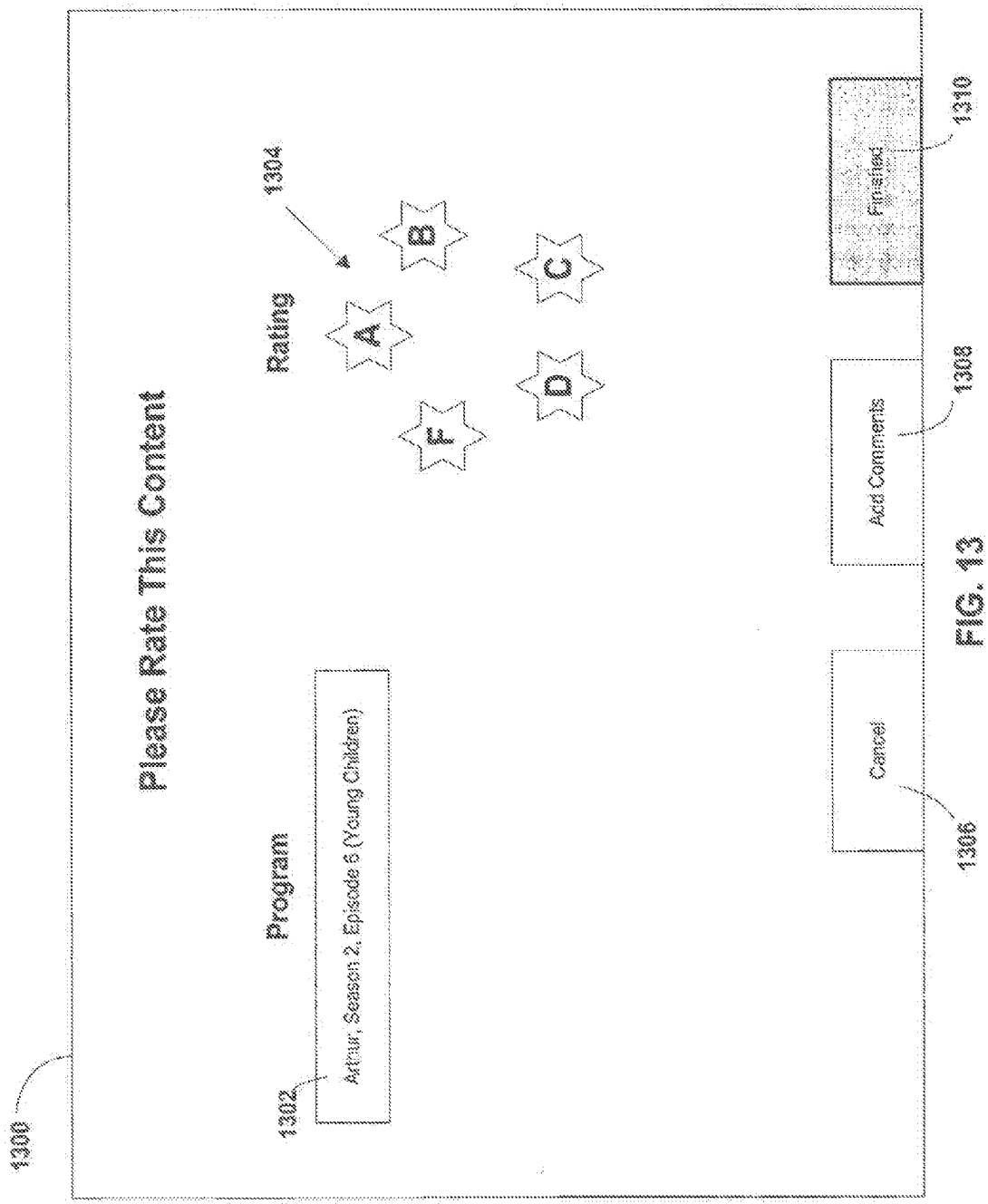
FIG. 13 shows an illustrative display screen for rating media content in accordance with one embodiment of the present invention.

FIG. 13 shows an illustrative display screen for rating media content in accordance with one embodiment of the invention. Ratings display 1300 may be presented to a user at any convenient time during or after the palette presentation. For example, the interactive content control application may present ratings display 1300 to a user after each element is presented in a palette. In other embodiments, ratings display 1300 is presented at the conclusion of the entire palette. Ratings display 1300 permits a user to rate, or rank, media list content according to some pre-defined rating criteria. In the example of FIG. 13, media content to be rated or ranked is displayed in program column 1302. Program column 1302 may include one or more elements to be rated, depending, for example, on the frequency of the presentation of ratings display 1300. The user may use an input device to highlight and select the desired rating from ratings selection 1304. In the example of FIG. 13, ratings selection 1304 includes a general letter ratings system (i.e., A, B, C, D, or F), but any suitable rating or ranking criteria (e.g., a numerical rating system) may be used. In addition, several ratings categories, such as plot, character development, and/or special effects, may be defined and individually rated.

User ratings submissions may be saved to a log file, storage device (e.g., recording device 110 of FIG. 1), memory, or a network location. An authorized supervisor in privileged mode may retrieve rating submissions associated with palette content to assist the authorized supervisor in setting up and maintaining palettes. For example, an authorized supervisor may choose to discontinue or remove media content that consistently receives poor ratings from palette viewers. In some embodiments, rating submissions received from ratings display 1300 are used by the interactive content control application in suggesting media content for inclusion in a palette. For example, media content that receives higher ratings may be suggested for inclusion in palettes more often than media content that receives lower ratings.

Still referring to FIG. 13, to discard ratings display 1300 without submitting a rating, a user may select cancel selection 1306. In some embodiments, ratings display 1300 may not be canceled. In these embodiments, a user must rate the media content listed in program column 1302 before continuing. If a user wishes to add more detailed comments to a rating submission, the user may select add comments selection 1308. Upon selecting add comments selection 1308, a text field may be presented to the user for the input of text comments relating to the rating submission. Alternatively or additionally, a menu of comments (e.g., "love it," "I want more like this," "this rocks," "never again" can be provided for ease of feedback. In some cases these comments are based on the content itself such as "more sports like this please," or "less baseball, more football" for sports or baseball program comments, or "I love SpongeBob" as appropriate for a SpongeBob Square Pants rating.

Figure 14:
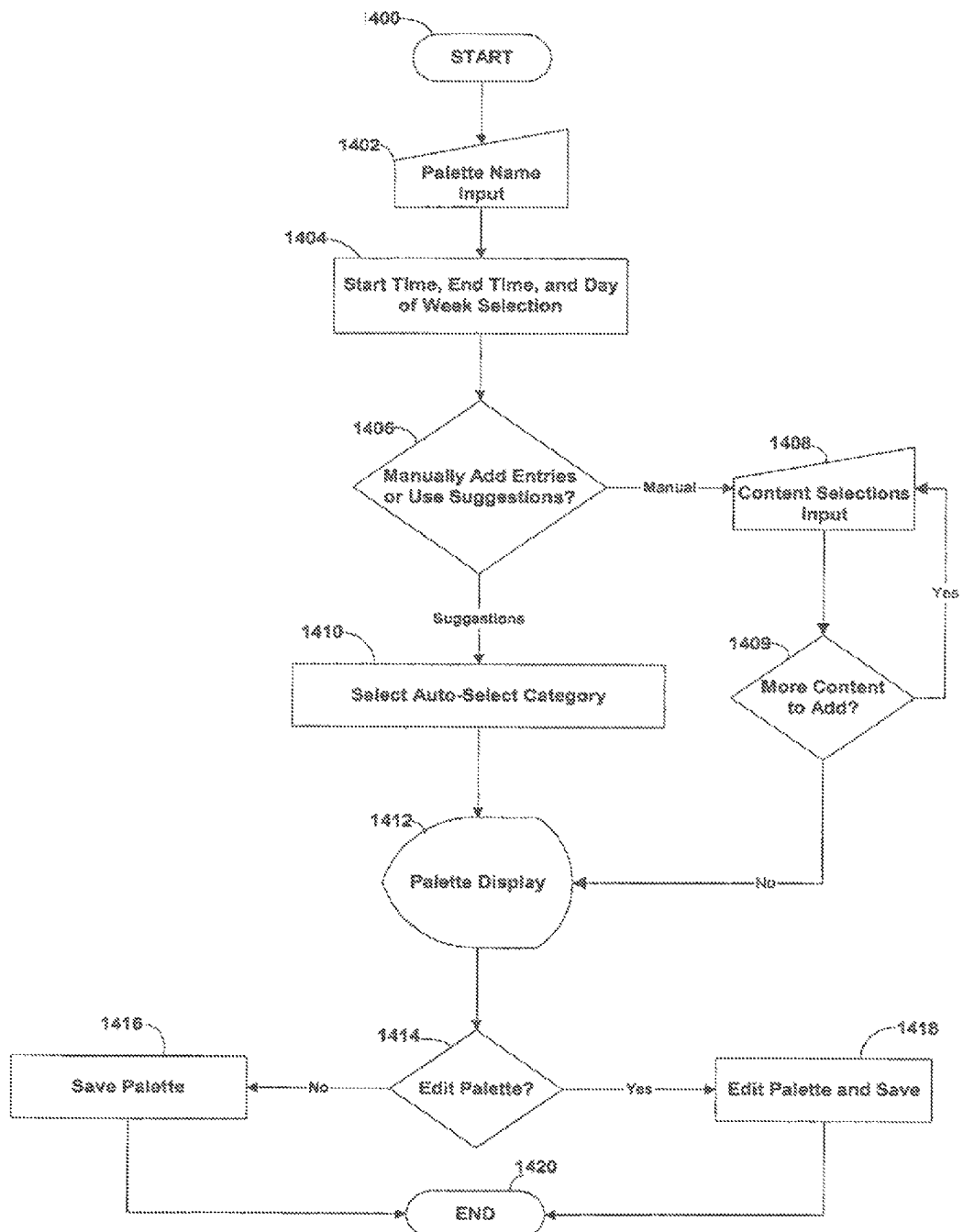
FIG. 14 shows a flow chart of an illustrative method for defining and scheduling a palette in accordance with one embodiment of the present invention.

FIG. 14 shows an illustrative method for creating a new palette in accordance with one embodiment of the invention. The user starts the palette creation process at start step 1400. In some embodiments, this step may correspond to the selection of create palette selection 612 of palette overlay 610. At input 1402, the user is given the opportunity to name the new palette. The user may input data using any available input device 106 of user equipment 102, including a voice recognition/verification module. If a duplicate or conflicting palette name is entered, the user may be prompted to choose a different name or overwrite the existing palette with the same name.

At step 1404, the supervisor schedules the palette by specifying a start time, end time, and day of week for running the palette. At decision step 1406, the interactive content control application determines whether the user has selected to manually add content and/or channels or use a suggestion list. If the supervisor chooses to manually input content and/or channels for the palette, the supervisor selects the content and/or channels for inclusion into the palette at manual input step 1408. The interactive content control application automatically translates the content selections into the appropriate media descriptors for inclusion in the palette. In some embodiments, to aid the supervisor in making manual suggestions, grid listings of linear programs (optionally adjusted to a specified palette run time), VOD listings, and DVR listings are provided to the supervisor in a convenient manner. In some embodiments, manual input step 1408 may correspond to presenting a screen to the supervisor, such as manual palette creation screen 700. At this input screen, the supervisor may link to interactive television program guide data to make media content selections. Content selections are typically made by highlighting the desired media content or channel name using an input device and pressing the "OK" or "Select" button. The supervisor may select content one media segment at a time or select multiple media segments from an interactive television program guide listing screen. For example, the supervisor may select broadcast programming, VOD programs, recorded content, content in attached media players, interactive applications, such as games, and Internet resources for inclusion into the palette. At decision step 1409, the interactive content control application determines if there are more content entries to add to the palette. If so, the process moves to manual input step 1408. If the content entry is complete, in step 1412, a palette display is presented to the user.

If the supervisor chooses to use program suggestions, the user may select a programming category at step 1410. Programming categories may contain preselected content and channels meeting certain user, system, or third-party criteria. For example, display 800 of FIG. 8 shows an illustrative category listing in accordance with one embodiment of the invention. Palette display 1312 presents the suggested or selected palette of permitted content to the supervisor for verification. Palette display 1412 may correspond to display 900 of FIG. 9 in the illustrated embodiment. The user is prompted at decision 1414 to edit the displayed palette. If desired, modification to any palette attribute, including, for example, start time, end time, day of week, and palette content, can be made by the supervisor at step 1418. If no modifications are desired at decision 1414, the palette is saved at step 1416. Finally, at step 1420 the user may be returned to the main menu overlay, the interactive content control application may terminate, or the user palette may be immediately launched.

Figure 15:
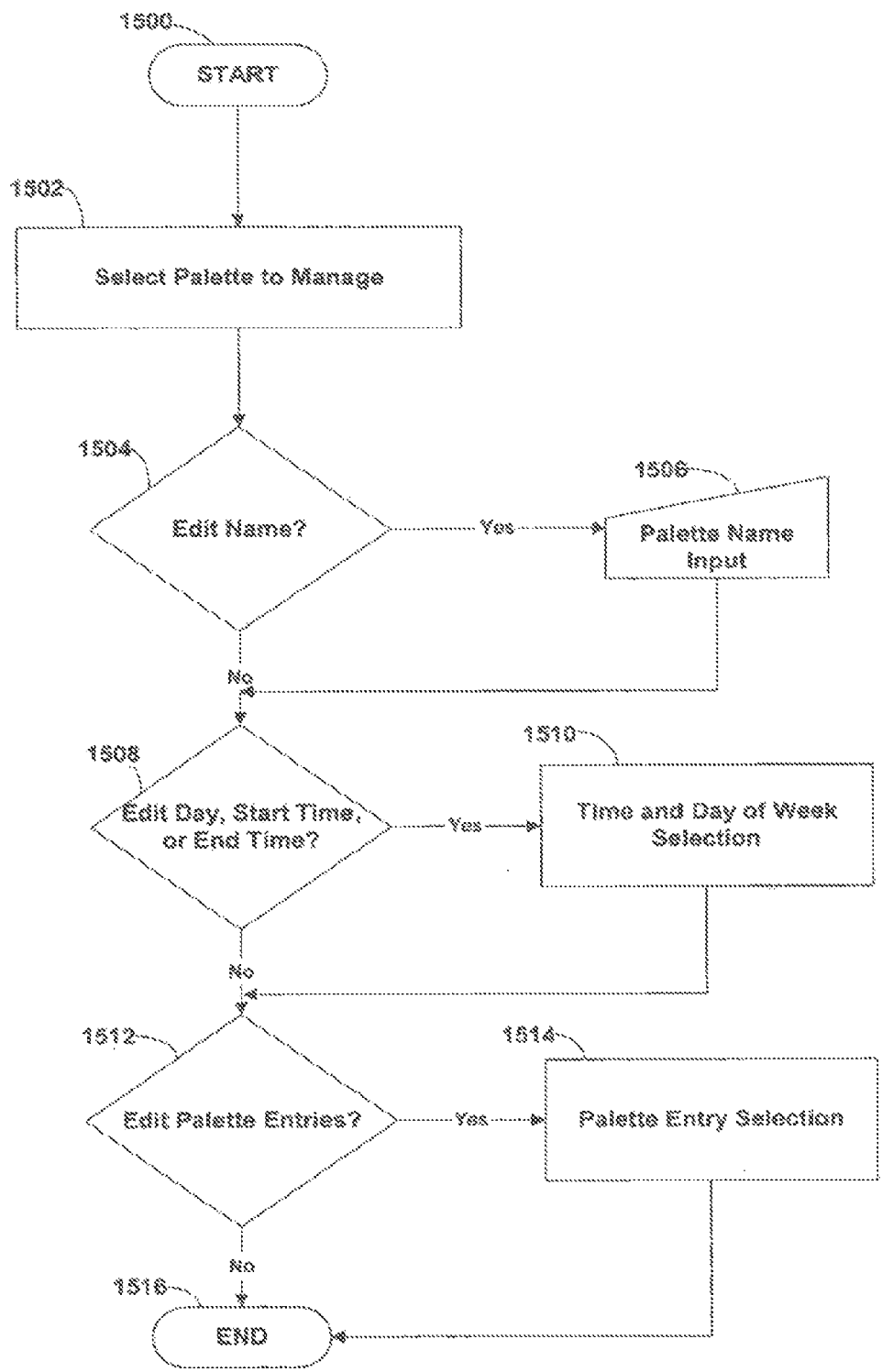
FIG. 15 shows a flow chart of an illustrative method for editing a palette of permitted media content or its associated launch attributes in accordance with one embodiment of the present invention.

FIG. 15 is a flowchart illustrating one method for editing an existing palette in accordance with one embodiment of the invention. The supervisor may start the edit process at step 1500 after, for example, selecting edit palette selection 614 from palette overlay 600 of FIG. 6. The user may also press an edit key or enter an edit command using input device 108 to arrive at step 1500. After being authorized by the content control application (not shown), the supervisor may select a palette to edit at step 1502. Supervisors with the appropriate permissions may edit any palette on the system; however, in one or more embodiments, users may only be allowed to edit palettes that they have created. At decision step 1504, the supervisor is given the opportunity to edit the name of the selected palette. If desired, the palette name may be modified at name input step 1506. At decision step 1508, the user is given the opportunity to edit the day or time the palette is to be launched and/or terminated. If desired, day and time modifications may be made at step 1510. Next, at decision step 1512, the user is given the opportunity to edit the palette media content and channel selections. If the user modified the day and/or time of the palette, the previous palette content may no longer be valid. In this case, the supervisor is required to select new content or mark the palette as inactive. The supervisor may edit the media content of the palette at step 1514. At this step, the user may be presented with, for example, suggestion category display 800 (FIG. 8) or manual palette creation screen 700 (FIG. 7) for modifying the entries in the palette. The supervisor completes the edit process at step 1516.

Figure 16:
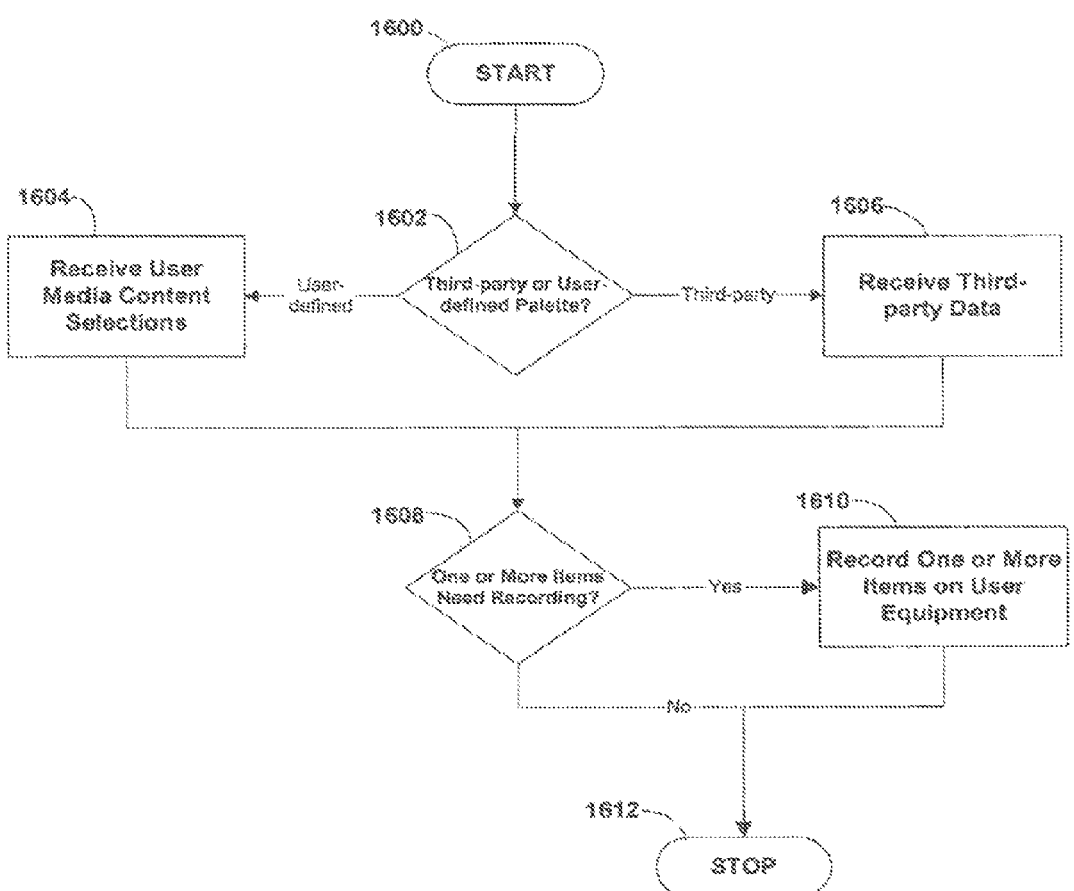
FIG. 16 shows a flow chart of an illustrative method for receiving third-party or user palette data and recording elements within a palette in accordance with one embodiment of the present invention.

FIG. 16 shows an illustrative method for receiving a third-party or user-defined palette definition and recording palette content in accordance with one embodiment of the invention. Some palettes will include media content that is broadcast (or otherwise made available) prior to the scheduled palette runtime. For these palettes, all or part of the palette content may be prerecorded for later presentation. The prerecording process begins at step 1600. This step could correspond to the user scheduling a suggested palette or manually creating a palette via manual palette creation screen 700. At step 1602 the interactive content control application determines if the palette is to be received from a third-party or if the palette is user-defined. If the palette is to be user-defined, the content control application receives user media content selections at step 1604. This step could correspond to the display of manual palette creation screen 700. If the palette is to be received from a third-party, the content control application receives third-party data at step 1606. After the palette data has been received via steps 1604 or 1606, the interactive content control application determines if all or part of the palette should be recorded at decision 1608. For example, a Saturday morning cartoon may be selected for inclusion in a Sunday morning palette. In this case, the Saturday morning cartoon will need to be recorded for later presentation during the Sunday morning palette runtime. If the interactive content control application determines that at least part of the palette needs to be recorded, the media content that needs to be recorded is recorded to recording device 110 (or a network location) at step 1610. After all or part of the palette is recorded, or if no content needs to be recorded, the illustrative recording process stops at step 1612.

Figure 17:
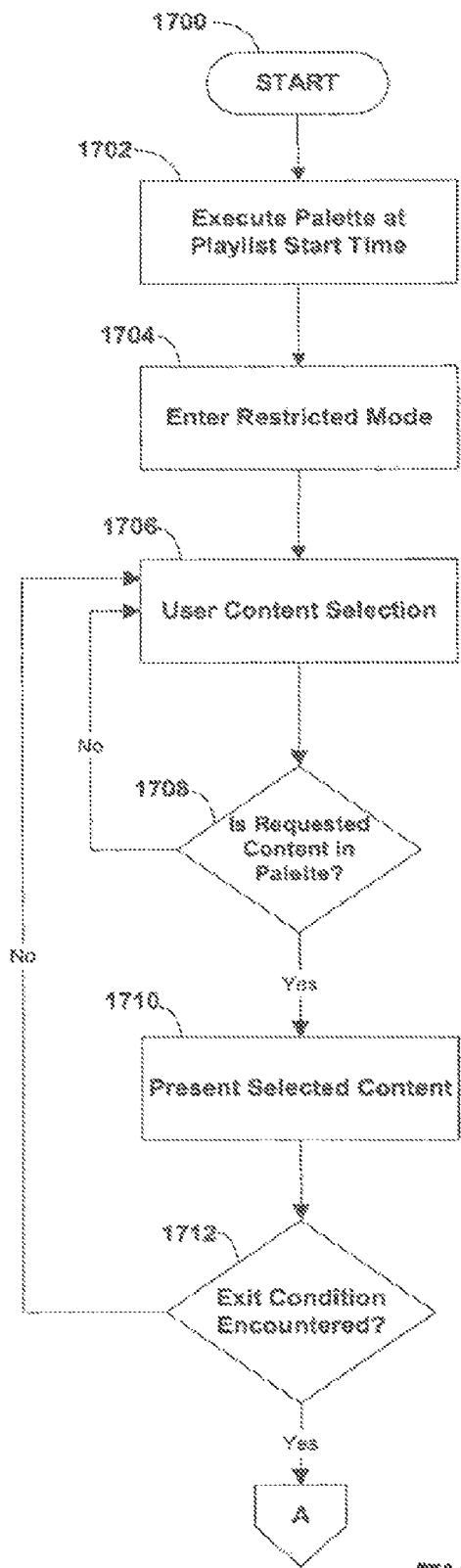
FIG. 17 shows a flow chart of an illustrative method for restricting media access to content included in a palette of permitted media content in accordance with one embodiment of the present invention.
Figure 18:
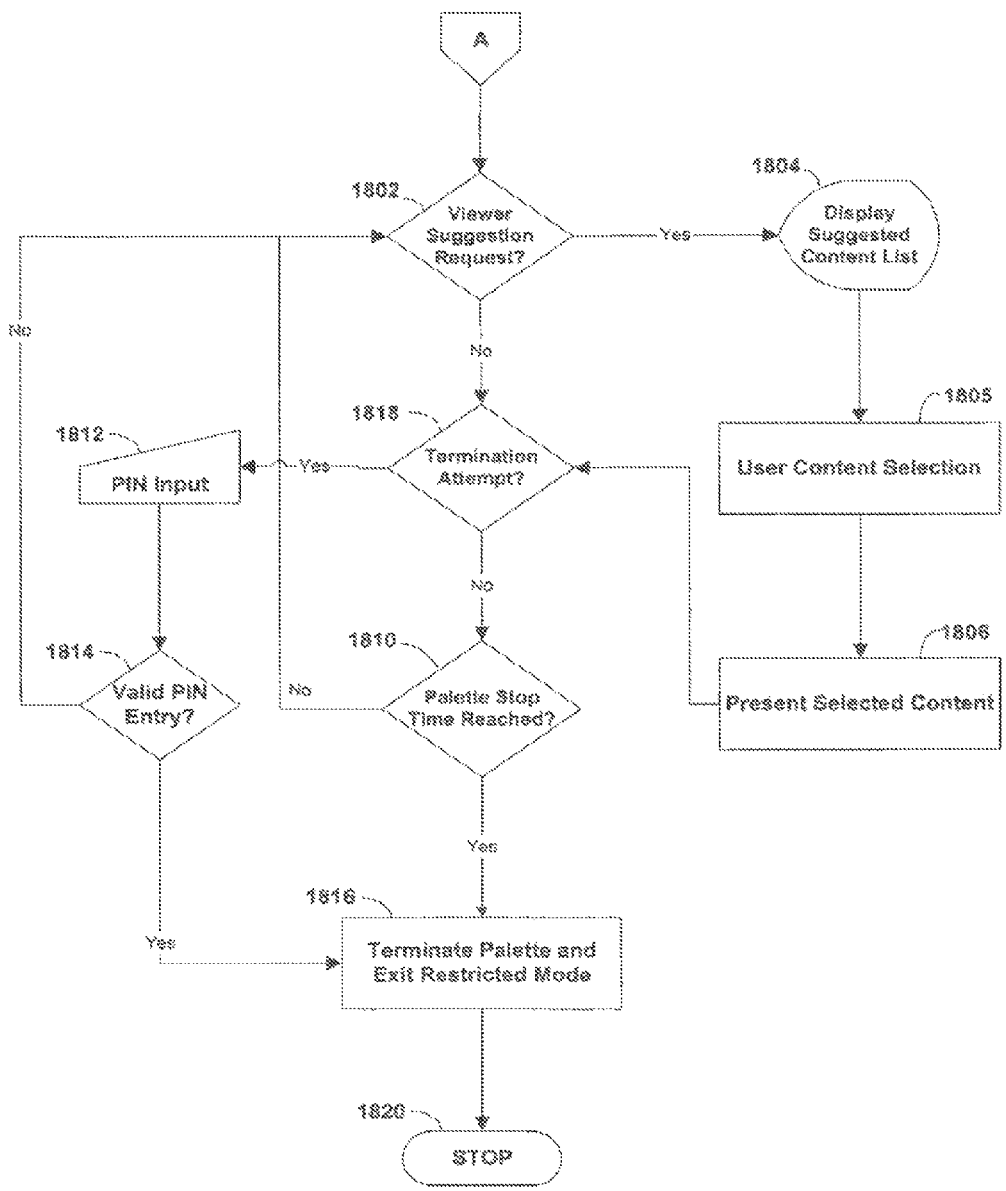
FIG. 18 shows a flow chart of an illustrative method for terminating a running palette after an exit condition in accordance with one embodiment of the present invention.

FIGS. 17 and 18 are flowcharts illustrating an illustrative method for executing a user palette in accordance with one embodiment of the invention. The presentation process starts at step 1700. At step 1702, an active palette is executed at the palette start time. The execution of an active palette causes the user to enter restricted mode at step 1704. If some portion of user equipment 102 is powered off (e.g., the tuner, set-top box, computer, television, hand-held device), then the interactive content control application may power on all necessary equipment at the palette start time and power off any necessary equipment at the palette end time.

At step 1706, the interactive content control application receives a user content request. User content requests are typically made using input device 108 (FIG. 1). These content requests may be made from an interactive television program guide listing (or other content listing) or made via a tuning sequence. For example, several tuning sequences are typically defined using input device 108, including, for example, channel/content up and down, recall (the previous channel/content), and specific station number and content tuning. The interactive content control application may then determine if the requested user content is designated by a media descriptor in an active palette of permitted content at decision 1708. If the selected content is included an active palette, the content is presented at step 1710. If the selected content is not included in an active palette, the user is given another opportunity to select content at step 1706. If the interactive content control application determines that an exit condition has occurred at step 1712, the presentation process continues in FIG. 18. If an exit condition is not encountered, control is passed back to user content selection 1706. Several exit conditions may be defined, including, for example, the start of another palette, the conclusion of the current palette (i.e., the palette's stop time has been reached), a parental control access code entry attempt, a request for viewer suggestions, or a station, system, or media content interruption. Unless a valid exit condition is detected at step 1712, the system continues to present media content selected by the viewer until the palette stop time is encountered. During the palette runtime, the interactive content control application prohibits terminating a running palette or tuning to content not included in the palette.

FIG. 18 continues the illustrative method for presenting content in a palette in accordance with one embodiment of the invention. The interactive content control application determines if the user has made a request for the viewer suggestion menu at decision step 1802. If so, at step 1804, a display of suggested content and/or channels may be presented to the user. The display may correspond to viewer suggestions display 1200 of FIG. 12. The user is permitted to select content from this display at content selection step 1805. Selected content may be presented to the user at step 1806. If the interactive content control application determines that the user has not requested content suggestions at decision step 1802 or after the user-selected suggested content is displayed at step 1806, the interactive content control application determines if a palette termination attempt has been made at decision 1808. If a palette termination has been made, parental control access code input 1812 is presented to the user. If the parental control access code is validated by the system at decision 1814, the palette execution may terminate immediately at step 1816. It the parental control access code is invalid, control may pass back to decision step 1802. If the interactive content control application determines that a termination request was not received at decision step 1808, the content control system next determines if the palette stop time has been reached at decision step 1810. If so, the palette execution may cease at step 1816. Otherwise, control may pass back up to decision step 1802. The palette presentation process concludes at stop step 1820.

It will be noted that all of the features described above in connection with the palettes of the interactive content control application may be applied to various types of programming, including broadcast programming, recorded content, Internet content, interactive applications and games, VOD programs, PPV programs, series of programs, or any other media content capable of being displayed or presented to, or interacted with, a viewer at user equipment 102.

The above described embodiments of the present invention are presented for purposes of illustration and not of limitation, and the present invention is limited only by the claims which follow.

What is claimed is:

1. A method for controlling the presentation of media content on user equipment, the method comprising:
   receiving, using control circuitry, a plurality of media descriptors for inclusion in a set of media descriptors, wherein each media descriptor of the plurality of media descriptors represents an individual permitted media content accessible by a user between a user-defined start time and a user-defined stop time;
   selecting an attribute of a media descriptor in the set of media descriptors;
   searching for a suggested media descriptor based on the selected attribute, wherein the suggested media descriptor is not already included in the set of media descriptors, and wherein the suggested media descriptor represents an individual permitted media content accessible by the user between the user-defined start time and the user-defined stop time;
   generating for display an option to include the suggested media descriptor in the set of media descriptors;
   receiving user input selecting the option to include the suggested media descriptor in the set of media descriptors;
   subsequent to the suggested media descriptor being included in the set of media descriptors, receiving a user request for media content between the user-defined start time and the user-defined stop time; and
   generating for display a media identifier for at least one of the individual permitted media content accessible by the user between the user-defined start time and the user-defined stop time in response to receiving the user request.

2. The method of claim 1 wherein the user request is made via a user equipment tuning sequence.

3. The method of claim 1 wherein the user request is made via a selection from a content listing.

4. The method of claim 3, wherein the content listing comprises the media descriptors included in the set of media descriptors.

5. The method of claim 3, wherein the content listing comprises all the media content accessible by the user equipment, the method further comprising:
   determining whether the user request is a request for at least one of the individual permitted media content; and
   restricting access to the requested media content in response to determining that the user request is not a request for at least one of the individual permitted media content.

6. The method of claim 1 wherein the suggested media descriptor is based on third-party data.

7. The method of claim 1 wherein the suggested media content has the lowest program content rating information accessible by the user equipment.

8. The method of claim 1 wherein the permitted media content is selected from a group consisting of broadcast channels, broadcast programs, recorded programs, video-on-demand programs, interactive applications, games, Internet websites, Internet newsgroups, and Internet chat rooms.

9. The method of claim 1 wherein the permitted media content is automatically tuned and presented in a default order.

10. The method of claim 9 wherein the default order is user-defined.

11. The method of claim 1 further comprising:
determining whether at least one permitted media content is available prior to the user-defined start time; and
recording the at least one permitted media content prior to the user-defined start time, when it is determined that the at least one permitted media content is available prior to the user-defined start time.

12. The method of claim 1 wherein at least one of the plurality of media descriptors is received from the user at the user equipment.

13. The method of claim 1 wherein at least one of the plurality of media descriptors is received from a third-party that is remote to the user equipment.

14. The method of claim 1, wherein receiving a plurality of media descriptors comprises receiving a user input identifying the plurality of media descriptors for inclusion in the set.

15. An apparatus for controlling the presentation of media content on user equipment, the apparatus comprising:
memory for storing at least one set of media descriptors; and
control circuitry for presenting media content, wherein the control circuitry is configured to:
receive a plurality of media descriptors for inclusion in the at least one set of media descriptors, wherein each media descriptor of the plurality of media descriptors represents an individual permitted media content accessible by a user between a user-defined start time and a user-defined stop time;
select an attribute of a media descriptor in the set of media descriptors;
search for a suggested media descriptor based on the selected attribute, wherein the suggested media descriptor is not already included in the set of media descriptors, and wherein the suggested media descriptor represents an individual permitted media content accessible by the user between the user-defined start time and the user-defined stop time;
generate for display an option to include the suggested media descriptor in the set of media descriptors;
receive user input selecting the option to include the suggested media descriptor in the set of media descriptors;
subsequent to the suggested media descriptor being included in the set of media descriptors, receive a user request for media content between the user-defined start time and the user-defined stop time; and
generate for display a media identifier for at least one of the individual permitted media content accessible by the user between the user-defined start time and the user-defined stop time in response to receiving the user request.

16. The apparatus of claim 15 wherein the user request is made via a user equipment tuning sequence.

17. The apparatus of claim 15 wherein the user request is made via a selection from a content listing.

18. The apparatus of claim 17, wherein the content listing comprises the media descriptors included in the at least one set of media descriptors.

19. The apparatus of claim 17, wherein the content listing comprises all the media content accessible by the user equipment, and the control circuitry is further configured to:
determine whether the user request is a request for at least one of the individual permitted media content; and
restrict access to the requested media content in response to determining that the user request is not a request for at least one of the individual permitted media content.

20. The apparatus of claim 15, wherein the suggested media descriptor is based on third-party data.

21. The apparatus of claim 15, wherein the permitted media content is selected from a group consisting of broadcast channels, broadcast programs, recorded programs, video-on-demand programs, interactive applications, games, Internet websites, Internet newsgroups, and Internet chat rooms.

22. The apparatus of claim 15 wherein the control circuitry is further configured to:
automatically tune and present the permitted media content in a default order.

23. The apparatus of claim 22, wherein the default order is user-defined.

24. The apparatus of claim 15, wherein the control circuitry is further configured to:
determine whether at least one permitted media content is available prior to the user-defined start time; and
record the at least one permitted media content prior to the user-defined start time, when it is determined that the at least one permitted media content is available prior to the user-defined start time.

25. A method for controlling the presentation of media content on user equipment, the method comprising:
receiving, using control circuitry, a plurality of media descriptors for inclusion in a set of media descriptors, wherein each media descriptor of the plurality of media descriptors represents an individual permitted media content accessible by a user between a user-defined start time and a user-defined stop time;
selecting an attribute of a media descriptor in the set of media descriptors;
searching for a suggested media descriptor based on the selected attribute, wherein the suggested media descriptor is not already included in the set of media descriptors, and wherein the suggested media descriptor represents an individual permitted media content accessible by the user between the user-defined start time and the user-defined stop time;
generating for display an option to include the suggested media descriptor in the set of media descriptors;
receiving user input selecting the option to include the suggested media descriptor in the set of media descriptors;
subsequent to the suggested media descriptor being included in the set of media descriptors, generating for display a media identifier for at least one of the individual permitted media content in response to receiving a user request for media content between the user-defined start time and the user-defined stop time; and
generating for display a media identifier for the individual permitted media content in a default content sequence if the user request is not received.

* * * * *